(12) United States Patent
Allen et al.

(10) Patent No.: US 12,592,093 B1
(45) Date of Patent: Mar. 31, 2026

(54) IMMUTABLE CHAIN OF PHYSICAL OBJECT PROVENANCE

(71) Applicant: SnowGhost Inc., Whitefish, MT (US)

(72) Inventors: Brett Allen, Whitefish, MT (US); Matthew Crest, Whitefish, MT (US); Ty Kennedy-Bowdoin, Redwood City, CA (US); William Mitsakos, Whitefish, MT (US); Kim Brandwijk, Groesbeek (NL)

(73) Assignee: SnowGhost Inc., Whitefish, MT (US)

( * ) Notice: Subject to any disclaimer, the term of this patent is extended or adjusted under 35 U.S.C. 154(b) by 383 days.

(21) Appl. No.: 18/477,208

(22) Filed: Sep. 28, 2023

Related U.S. Application Data

(60) Provisional application No. 63/377,523, filed on Sep. 28, 2022.

(51) Int. Cl.
| | |
|---|---|
| *G06V 20/00* | (2022.01) |
| *G06Q 30/018* | (2023.01) |
| *G06T 7/194* | (2017.01) |
| *G06V 10/26* | (2022.01) |
| *G06V 10/40* | (2022.01) |
| *G06V 10/74* | (2022.01) |

(52) U.S. Cl.
CPC ......... *G06V 20/95* (2022.01); *G06Q 30/0185* (2013.01); *G06T 7/194* (2017.01); *G06V 10/26* (2022.01); *G06V 10/40* (2022.01); *G06V 10/74* (2022.01)

(58) Field of Classification Search
CPC ........ G06V 20/95; G06V 10/26; G06V 10/40; G06Q 30/0185; G06T 7/194
See application file for complete search history.

(56) References Cited

U.S. PATENT DOCUMENTS

| | | | |
|---|---|---|---|
| 9,378,431 B2 | 6/2016 | Stoeffler et al. | |
| 10,147,399 B1 * | 12/2018 | Mott | G06V 20/10 |
| 10,277,950 B2 | 4/2019 | Saxena et al. | |
| 10,915,749 B2 | 2/2021 | Ross et al. | |
| 11,232,549 B2 | 1/2022 | Narasimha-Iyer | |
| 11,455,714 B2 | 9/2022 | Mok et al. | |

(Continued)

OTHER PUBLICATIONS

My Smart Gadget, "How to Find Location from Photos on Your iPhone (And Get Directions too)" (Year: 2021).*

*Primary Examiner* — Gandhi Thirugnanam
*Assistant Examiner* — Wayne Zhang
(74) *Attorney, Agent, or Firm* — NetLawyers LLP; Benedict O'Mahoney

(57) ABSTRACT

Disclosed is a system and method for verifying the authenticity of physical objects by implementing an immutable chain of physical object provenance. The invention provides for verifying the provenance of a unique physical object such as a collectible by processing an image of the collectible and associating it with identification information of the user and geolocation information associated with the collectible, and storing that information in a datastore. The invention then provides for generating a segment mask by submitting the image and one or more prompts to a segmentation component, which will return a mask that can be used to match a subsequent purported image of the collectible to verify its authenticity. Any subsequent changes will likewise be stored on the blockchain to provide an immutable chain of provenance.

16 Claims, 20 Drawing Sheets

(56)             References Cited

U.S. PATENT DOCUMENTS

| | | | |
|---|---|---|---|
| 2003/0171965 A1* | 9/2003 | Ratzlaff ............. | G06Q 10/1093 |
| | | | 705/7.18 |
| 2016/0092724 A1* | 3/2016 | Jeong .................... | G06V 40/50 |
| | | | 348/77 |
| 2016/0171669 A1* | 6/2016 | Abdollahian ............. | G06T 5/77 |
| | | | 382/254 |
| 2018/0053069 A1 | 2/2018 | Kale et al. | |
| 2019/0036680 A1* | 1/2019 | Sundaresan ............... | H04L 9/30 |
| 2021/0150611 A1 | 5/2021 | Morin et al. | |
| 2024/0412233 A1* | 12/2024 | Yan ..................... | G06V 10/764 |

* cited by examiner

140

130

110

IMMUTABLE CHAIN OF PHYSICAL OBJECT PROVENANCE

CROSS-REFERENCE TO RELATED APPLICATIONS

The present application claims the benefit of U.S. Provisional Application No. 63/377,523 filed Sep. 28, 2022, by Brett Allen and William Mitsakos, titled "Secure Non-Fungible Token Management System", which is included by reference herein and for which benefit of the priority date is hereby claimed.

FEDERALLY SPONSORED RESEARCH

Not applicable.

SEQUENCE LISTING OR PROGRAM

Not applicable.

FIELD OF INVENTION

The embodiments described herein are related to the identification and tracking of unique physical objects. Specifically, the invention is directed towards the verification of provenance of collectibles.

BACKGROUND OF THE INVENTION

There are many platforms for the online sale of physical objects. Serial numbers, barcodes, RFID tags, and similar physical object identifiers exist for one main reason: to know what object they are attached to. They work well for mass produced items or in a controlled environment but are either not durable enough to last for years or prove incompatible with unique objects. Blockchain provides verification and traceability (trust) of data by way of an immutable ledger. While it has proven a viable and valuable technology for many industries, unfortunately it relies on data being in a digital format.

The difficulty is increased with regard to establishing provenance for physical objects that are unique. The world of collectibles, be it art, rare coins, stamps, or even limited-edition sneakers, holds significant cultural and financial value. Ensuring the authenticity, provenance, and ownership of these objects has always been a priority for collectors, dealers, and museums.

Traditionally, the process of validating the authenticity of a collectible largely depended on expert judgment, physical certificates of authenticity, and intricate databases. These methods, although effective to some extent, come with challenges. For example, experts can sometimes have conflicting opinions. Physical certificates can be duplicated or faked. Centralized databases can be manipulated if not secured properly.

Computer vision is the ability of computers to interpret and make decisions based on visual data. It can enhance the ability to track physical collectibles through digital fingerprinting, image recognition and continuous verification. With digital fingerprinting, just as every human has a unique fingerprint, every physical object has minute details that can serve as its unique identifier. Computer vision can capture these details, creating a 'digital fingerprint'. With image recognition, using trained models, computer vision can differentiate between a genuine collectible and a fake, by comparing an object's digital fingerprint against a database of known authentic pieces. With continuous verification, with mobile apps, collectors can frequently scan their pieces to verify their authenticity.

What is needed is an immutable chain of physical object provenance which will render the challenges of physical object identifiers moot and bring the concepts and benefits of blockchain to the physical world.

The present invention facilitates secure transactions of unique collectibles by enabling an immutable chain of physical object provenance.

SUMMARY OF THE INVENTION

Systems and methods for establishing an immutable chain of physical object provenance are described herein.

Computer vision and blockchain technologies offer a new paradigm for tracking unique physical objects. The present invention integrates computer vision's capability to create digital fingerprints with blockchain's secure record-keeping, resulting in a powerful system for the collectibles industry. Verification and registration is provided wherein collectibles can be scanned using computer vision to create a digital fingerprint. This fingerprint, along with details about its origin, date of creation, and more, is then registered on the blockchain.

Transfer of ownership can be securely documented; when a collectible is sold, the blockchain record is updated, and the new owner can verify the piece using its digital fingerprint. Fraud prevention is inherent as any attempt to sell a counterfeit will be caught when its digital fingerprint doesn't match the blockchain records.

Definitions

A Collectible is a unique physical object. A Collectible is a pre-existing tangible product or good, created, manufactured or produced that has at least one feature that distinguishes it from other physical objects. It may further acquire its value vis a vis various factors, including, without limitation, its previous user(s) and/or owner(s) as well as the name and likeness (or other IP) it embodies.

A GN, also referred to as a ghost note, is a digital certificate of provenance associated with a Collectible. A GN certifies provenance, a certificate of trust, and a receipt for goods bought and sold, on a permanent and distributed ledger. A GN can also incorporate copyrights combined with merchandising rights (physical and digital) enabling initial and reoccurring royalties on sales and resales.

A GN Collectible is a Collectible that has an associated GN.

A Platform is an online exchange for Collectibles.

An Originator is a user with a Collectible who utilizes the Platform to create a GN.

A Seller is a user who utilizes the Platform to sell a GN Collectible.

A Buyer is a user who utilizes the Platform to purchase a GN Collectible.

A Creator is a user who creates, manufactures or produces a Collectible.

A Verifier is a user who utilizes the Platform to verify whether a Candidate object matches a Collectible. A Verifier may be an Originator or Seller establishing provenance before shipping a GN Collectible to a Buyer, or a Buyer establishing provenance upon receipt of a GN Collectible.

An Updater is a user who utilizes the Platform to verify whether an Update object matches a Collectible and further updates feature information, geolocation information, or temporal information. An Updater may be an Originator or Seller establishing provenance before shipping a GN Collectible to a Buyer when feature information has changed, or when geolocation or temporal thresholds of a previous submission have been exceeded.

ID information is information that uniquely identifies a particular user, including an Originator, Creator, Buyer, Seller, Verifier and Updater.

MFP is an acronym for "Multi-Factor Provenance", and is an easy to use, permanent registry, and fast check-out system that provides cultural provenance and authentication for the life of the Collectible. This process can utilize blockchain and computer vision technologies. In multi-factor provenance, in one embodiment of the present invention, the first factor is user identification information, the second factor is geolocation information associated with the Collectible, and the third factor is physical object verification information associated with the Collectible.

An Origin image is an image of the Collectible captured by an electronic device such as a smartphone equipped with a camera component and a geolocation component.

An Origination date is the date that the Origin image was created and submitted to the Platform.

An Origin geolocation is the geolocation coordinates of the collectible obtained from the geolocation component of the smartphone.

A Feature is a characteristic of a Collectible that distinguishes it from other physical objects.

A Feature description is a text summary describing an individual feature.

A Golden mask is that last mask that was used to verify the provenance of the Collectible.

In one embodiment of the present invention, a GN attaches merchandising rights to the Collectible, and accompanies the Collectible in perpetuity, giving the Creator the ability to create, sell, and profit repeatedly from all future re-sales via a royalty.

In one embodiment of the present invention, an Originator owns a Collectible and desires to sell it on the Platform. The Collectible is scanned into the Platform, which creates a GN to accompany the Collectible for life, and which re-identifies itself every time it is bought and resold.

MFP is the process whereby Originators, Sellers and Buyers authenticate and certify their GNs with Person, Product, and Place attributes (in one embodiment, this occurs in 30 seconds or less), enriching the cultural residue and legacy of the work, all whilst managing the security in a seamless non-invasive way. In one embodiment of the invention, MFP makes use of a mobile device's identity recognition technology, computer vision, and geolocation services to establish provenance.

Derivative works are Collectibles based on the intellectual property of a pre-existing Collectible. Creators can encourage and allow derivative works of their Collectibles.

Components of the Platform may be accessed through a web-based Portal. Users accessing the Portal in response to marketing pulls or web searching can visit the gallery without first establishing an account. A home page can contain an invitation for them to join the community if they wish. If a user clicks on a 'buy' tab in the gallery, the Portal will transit them to the 'set up an account' page. In one embodiment, the Portal will have a limited number of collectibles in a gallery. In one embodiment, most features of the Platform will be on mobile through direct links.

In one embodiment, Creators and Sellers are required to set up an account as first step before continuing with interactions. The profile requirements can include full name, mailing address, country of residence, communications preferences, text, email, royalty payment preference, etc. In one embodiment, traditional profile information such as social security number, drivers license number, and passport number are not required.

In one embodiment, Buyers would be directed to set up a account when 'buy' button is selected. Once a Buyer is registered, the rest of the profile requirements would be obtained. Payment information would also be required for Buyers.

All account holders on the Platform would generate a permanent I.D. number, which could be generated by a random number generator to inhibit future hacking. In one embodiment, the ID would be a hash number on the blockchain.

In one embodiment of the present invention, each Collectible has an asset profile. If the Collectible is being added to the gallery by an Originator, the asset profile could include such information as the name of asset, a brief description, date created, location (city, state, and country where the asset was created), and the price. In one embodiment, the Creator could provide a digital authentication document based on a format provided by the Platform. In one embodiment, the Creator could provide additional optional information, such as pictures or links to material outside of the Platform.

In the situation where a Collectible is being added to the gallery by a non-Creator Seller and if a resale of an asset that was previously handled by GN, then the asset number which brings with it all the information and full authentication. The Seller would need to provide the price. In the case of a first time sale of an asset by a non-Creator Seller, the Seller would need to provide name of asset, brief description, date created (month, year), location (city, state, and country where the asset was created), price, the seller's digital authentication document for the asset. The seller can input additional information, pictures, etc. as is preferred. In one embodiment, the Collectible is further authenticated via MFP. For all new Collectibles, the Platform would generate a permanent I.D. number.

In embodiments of the present invention, the pricing of Collectibles may be derived using a plurality of strategies. In one embodiment, the Buyer establishes price desired and the Platform adds royalty amount. The Seller only sees the total price, not the underlaying calculations; transaction fees are included in the payment process after the sale is made. In one embodiment, the Creator functioning as a Seller establishes fixed price for a Collectibles as it's loaded into the Platform. All buyers see the fixed price as take-it-or-leave-it. In one embodiment, the Creator functioning as a Seller changes the fixed price because it isn't selling or, if multiple copies, selling too fast; the Platform adjusts the royalty and all buyers see the adjusted fixed price as take-it-or-leave-it.

In the case where the potential Buyer contacts the Seller outside of the Platform and negotiates a different price which results in the sell adjusting the fixed price to become the unofficially agreed-upon negotiated price which the Buyer quickly buys.

In one embodiment, the Creator functioning as a Seller establishes the list price for a Collectible as it's loaded into the Platform. The Platform carries the following pricing indicators: (1) the price is fixed and this asset can be purchased immediately, (2) the price is negotiable but offers below a floor amount will not be considered, or (3) other offers will be considered for the next 48 hours. The seller can buy immediately at the fixed price or make a counteroffer and take the chance that the asset will be available for sale at the end of the 48 hours.

In one embodiment, the Platform does not warehouse the Collectibles. After being notified that the Buyer's payment is in escrow, the Seller has responsibility to make shipment directly to Buyer. Platform will send message to Seller with shipping address and how-to guidance; shipping alternatives, packaging suggestions, and insurance suggestion. In one embodiment, shipping costs are borne by Seller. The Buyer then notifies Platform when the shipment is received. This triggers the Platform to release payment to Seller and initiates royalty flows. This also triggers the Platform to send GN asset provenance document to buyer.

In one embodiment, a hashed URL is used to identify the Collectible. The hashed URL can be utilized to locate and extract properties of the Collectible. Users can post the hashed URLs on their social media accounts, and users can access the links to obtain information about the Collectible. In one embodiment, the hashed URL has record of the transaction, and can include the object or a pointer to the object, the current transaction, transaction history, virtuous loop engagement, shipping and delivery receipt, and other information. In one embodiment of the present invention, each product will have web page, information about owner, and other relevant information. The webpage will be accessed using the latest hash of that product's blockchain. This provides a distributed material network and no one needs to have copies of the ledger, because all of the Works can be accessed by the hash.

In one embodiment, the Creator initiates the transaction. The data input by the Creator for royalty payments provides a robust validation of that person. The Creator Portal profile inputs are required to set up an account as the first step before continuing with interactions. The required information includes full name, mail address, communications preferences (mail, text or email), sales payment preference (check, wire), royalty payment preference (check, wire), bio-information using Platform template (name, year of birth, training/education, awards, etc.), and other information.

In one embodiment, the Creator loads Collectibles onto the Platform using a template and providing information such as genre, name of the Collectible, short description, long description, an image generated via computer vision or similar app which will be captured as part of the initial loading of the Collectible into the gallery. The name of the Creator will be extracted from the Creator Profile. The Platform will then generate a permanent item number.

Buyers can buy Collectibles, but do not acquire IP rights by default. Sellers can sell Collectibles. In one embodiment, if the Seller is the Creator and is selling a Collectible, then the Seller as Creator would receive a continuing royalty. In one embodiment, if the Seller is not the Creator and is selling a Collectible, then the Seller does not receive a continuing royalty. In one embodiment, the Seller does receive a continuing royalty.

In one embodiment of the present invention, sales on the Platform are focused on pre-selected Creators. There may be incentives for Creators who are also Sellers. In one embodiment, Buyers could be limited to family and friends of the Creator. In one embodiment, the Platform has a process in which the Seller has to approve a Buyer before the buying process can be completed; this keeps the volume focused on family and friends.

In one embodiment of the invention provides for verifying the provenance of a unique physical object such as a collectible by processing an image of the collectible and associating it with identification information of the user and geolocation information associated with the collectible, and storing that information in a datastore. In one embodiment, the invention provides for generating a segment mask of the collectible to isolate the image from the background. This can be done by submitting the image and one or more prompts to a segmentation component, which will return a mask that can be used to match a subsequent purported image of the collectible to verify its authenticity.

The segmentation component can advantageously utility computer vision. Object segmentation is a process in computer vision that involves partitioning an image into multiple segments (sets of pixels), where each segment corresponds to an object or part of an object. The aim is to simplify the representation of an image to make it easier to analyze and recognize individual objects.

Various methods of segmentation can be used. Zero-shot segmentation refers to the task of segmenting objects in images without having seen any annotated examples of those objects during training. Traditional segmentation models require a vast amount of labeled data for each class they're expected to recognize. In contrast, zero-shot methods aim to recognize and segment classes that were not seen during the training phase. The "zero-shot" paradigm is based on transferring knowledge from seen classes (those the model was trained on) to unseen classes (those the model wasn't trained on). This is usually achieved by leveraging semantic embeddings or representations, such as word vectors, which capture the relationships between different classes.

Other algorithms the could be employed include algorithms like Faster R-CNN, YOLO (You Only Look Once), and SSD (Single Shot MultiBox Detector) predict bounding boxes around objects in images. These bounding boxes encapsulate the spatial extent of the detected objects. Some algorithms combine bounding box prediction with instance segmentation to provide a mask for each detected object within its bounding box. A popular example of this is Mask R-CNN. It extends Faster R-CNN by adding a branch for predicting an object mask in parallel with the existing branch for bounding box recognition. Sometimes, bounding boxes are used as weak annotations for training segmentation models. Instead of having pixel-wise masks for training, these methods use bounding boxes to provide approximate locations of objects and then use various techniques to predict the precise segmentation within these boxes. Some interactive segmentation techniques allow users to draw bounding boxes (or rectangles) around objects of interest, which the algorithm then uses as a starting point to refine and produce a detailed segmentation mask.

Homography can be used advantageously in the matching process. In the context of computer vision and image processing, refers to the transformation between two images of the same scene or object taken from different viewpoints or camera orientations. It is especially relevant when the scene or object is viewed on a planar surface.

If you have two images of an object, homography can help verify if they are of the same object by establishing a projective transformation that maps points in one image to corresponding points in the other image. In one embodiment, it can be implemented by feature detection, where you detect key points or features in both images. Algorithms like SIFT (Scale-Invariant Feature Transform), SURF (Speeded-Up Robust Features), and ORB (Oriented FAST and Rotated BRIEF) are can used for this purpose. Once features are detected, match features from the first image with features from the second image. This gives a set of corresponding points between the two images. Algorithms like FLANN (Fast Library for Approximate Nearest Neighbors) can be used to speed up this process. With a set of corresponding feature points established, compute the homography matrix that transforms coordinates from the first image to the second. This can be done using methods like the RANSAC (Random Sample Consensus) algorithm to robustly estimate the transformation while ignoring outliers. Then use the computed homography matrix to warp or transform the first image so that it aligns with the second image. If a large portion of the transformed image aligns well with the second image, it suggests that both images are of the same object or scene. On the other hand, if the alignment is poor, it's likely they are not of the same object. Next, measure the quality of the alignment using metrics or visual inspection. The root mean square error (RMSE) between matched points after transformation, for instance, can provide a quantitative measure of alignment quality.

These and other features, aspects, and embodiments are described below in the section entitled "Detailed Description."

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION

Figure 1:
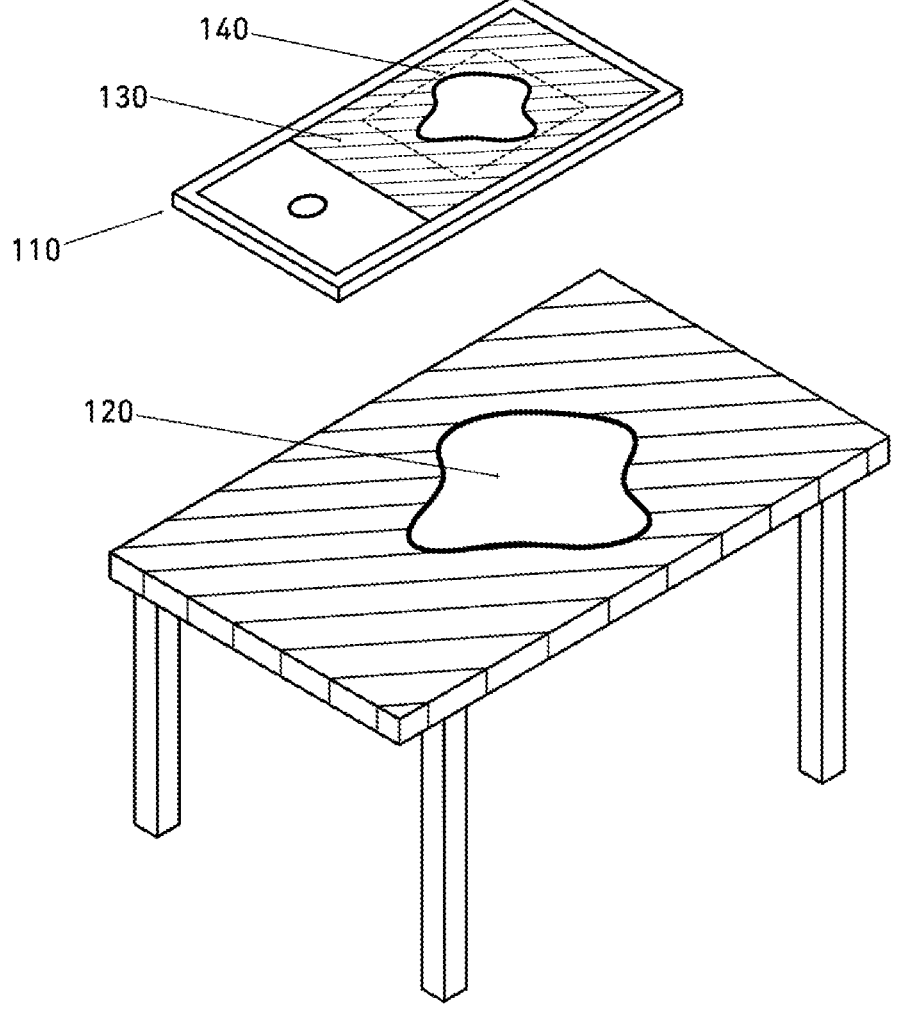
FIG. 1 is an illustration of a smartphone device capturing an origin image of a collectible.

Before the invention is described in further detail, it is to be understood that the invention is not limited to the particular embodiments described, as such may, of course, vary. It is also to be understood that the terminology used herein is for the purpose of describing particular embodiments only, and not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed with the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, if dates of publication are provided, they may be different from the actual publication dates and may need to be confirmed independently.

In one embodiment of the present invention, the immutable chain of physical object provenance is implemented by obtaining a capture of an origin image of a collectible along with originator ID information and origin geolocation. The origin image of a collectible is a live photo capture of the collectible taken from a smartphone device. The live photo capture is obtained within an app distributed by the Platform that is running on the smartphone device. The app accesses the camera component of the smartphone device operating system to ensure that the image of the collectible is obtained live from the camera, and will not allow an image to be uploaded from the photo gallery, or from a file. Additionally, the app accesses the geolocation component of the smartphone device to obtain the geolocation coordinates of the image being taken. Additionally, the app accesses the clock component of the smartphone device operating system to obtain the date timestamp of when the image was obtained. The app is also communicatively connected to the Platform which authenticates the originator's account and ensures the identity of the originator on each interaction with the Platform. In one embodiment, the Platform uses JWT to ensure the identity of the originator accessing a backend server by issuing a signed token upon initial authentication and then validating this token's signature and claims in subsequent requests.

FIG. 1 shows a smartphone device 110 capturing an origin image 130 of a collectible 120. The origin image 130 is shown with a bounding box 140 overlayed on the display.

Figure 2:
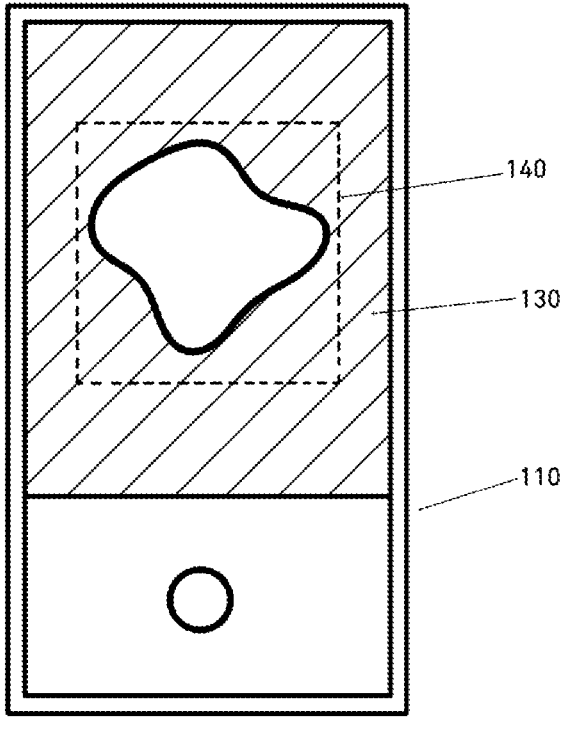
FIG. 2 is an illustration of a smartphone device capturing an origin image.

FIG. 2 is a front view of the smartphone device 110 displaying the origin image 130 with a bounding box 140 overlayed on the display.

Figure 3:
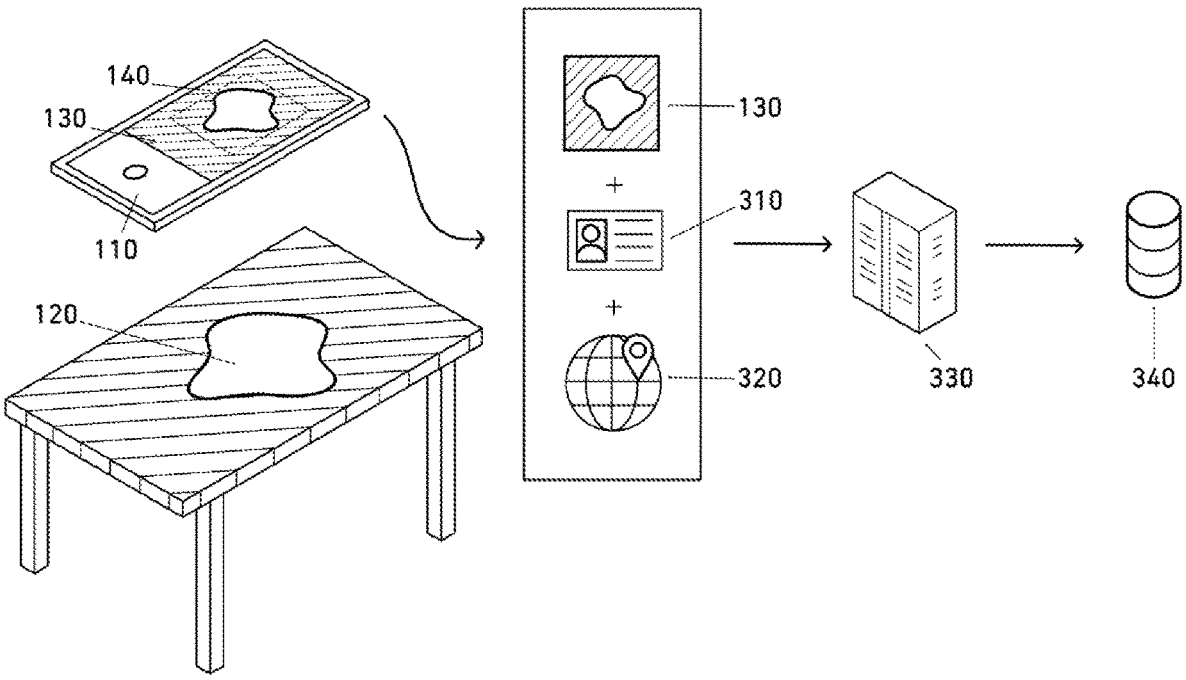
FIG. 3 is a flow diagram showing the origin capture process.

FIG. 3 shows the origin capture process wherein the smartphone device 110 captures an origin image 130 of a collectible 120. The origin image 130 is shown with a bounding box 140 overlayed on the display. The smartphone device 110 is communicatively connected to the Platform and through the app sends the origin image 130, originator ID information 310 and origin geolocation 320 to backend server 330, which then stores the origin image 130, originator ID information 310 and origin geolocation 320 into a datastore 340. In one embodiment, the origin image 130 is stored in an object storage for performance and scalability, and the originator ID information 310 and origin geolocation 320 and a pointer to the object storage location of the origin image 130 are stored in a NoSQL or relational database. In one embodiment, the app captures the origin image 130 when the originator presses the camera button. In one embodiment, the app determines when the optimal alignment is reached and automatically triggers the camera component of the smartphone device operating system to capture the origin image 130. In one embodiment, the origin image 130 sent back to the backend server is the portion of the image within the bounding box 140. In one embodiment, background outside of the bounding box 140 is displayed as blurred.

Figure 4:
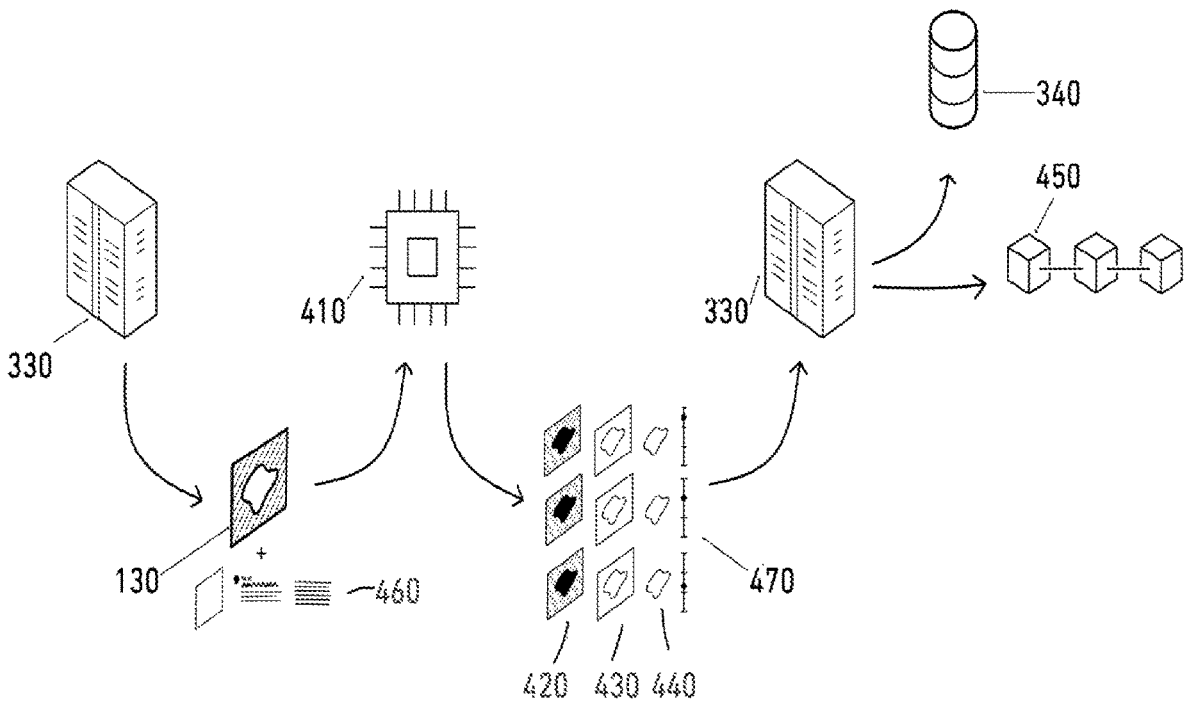
FIG. 4 is a flow diagram showing the origin masking process.

FIG. 4 shows the origin masking process. In one embodiment, this process is triggered when the origin image 130 is received by the backend server 330. In one embodiment, the origin masking process is run asynchronously. The origin masking process generates an origin mask which comprises a segment image 420, a segment mask 430 and a segment cutout 440. In one embodiment, the segmentation component 410 (also referred to as a segment component) also returns a confidence factor for each segment mask 430. In one embodiment, multiple segment images 420, segment masks 430, and segment cutouts 440 are generated, and the backend server selects the segment image 420, segment mask 430 and segment cutout 440 that has the highest confidence factor returned by the segmentation component 410. The origin masking process starts with the backend server 330 sending the origin image 130 and at least one prompt 460 to a segmentation component 410 for processing. The segmentation component 410 then returns an origin mask comprising a segment image 420, a segment mask 430 and a segment cutout 440, or in one embodiment as shown, multiple segment images 420, segment masks 430, and segment cutouts 440, which are sent back to the backend server 330. If one segment image 420, segment mask 430 and segment cutout 440 are returned, then the segment image 420, segment mask 430 and segment cutout 440 are stored in the datastore 340. If multiple segment images 420, segment masks 430, and segment cutouts 440 are returned, the backend server 330 selects the segment image 420, segment mask 430 and segment cutout 440 that has the highest confidence factor returned by the segmentation component 410. The backend server 330 then designates the selected segment mask 430 as a golden mask, designates the selected segment cutout 440 as a golden cutout and designates the origin image 130 as a golden image. The backend server 330 then stores the originator ID information, the origin geolocation, the golden image and each prompt 460 on a blockchain 450.

Continuing with FIG. 4, in one embodiment, the segmentation component 410 utilizes a process in computer vision where the origin image 130 is divided into multiple segments (or sets of pixels), with each segment representing a distinct object or part of the image. The goal is to simplify or change the representation of an image into something more meaningful and extract the collectible from the background. In one embodiment, semantic segmentation is utilized wherein pixels are categorized into predefined classes. In one embodiment, instance segmentation is utilized wherein individual object instances are distinguished.

Continuing with FIG. 4, models utilized by the segmentation component 410, especially those based on the transformer architecture or fine-tuned versions of popular vision models, can leverage prompts or additional information to better guide their outputs. By passing relevant prompts, the segmentation component 410 can get a clearer idea of what the collectible is, leading to more accurate or contextually appropriate segmentations. If the segmentation component is aware of the specific domain or context of the image, it can adjust its segmentation strategy accordingly. Additionally, for models that might overfit to certain patterns or lack exposure to varied data, prompts can help the segmentation component 410 generalize better by providing hints or directions. In one embodiment of the present invention, at least one prompt 460 comprises the bounding box. In one embodiment, the at least one prompt 460 comprises the origin image 130, a description of features on the origin image, locations of the features on the origin image.

Figure 5:
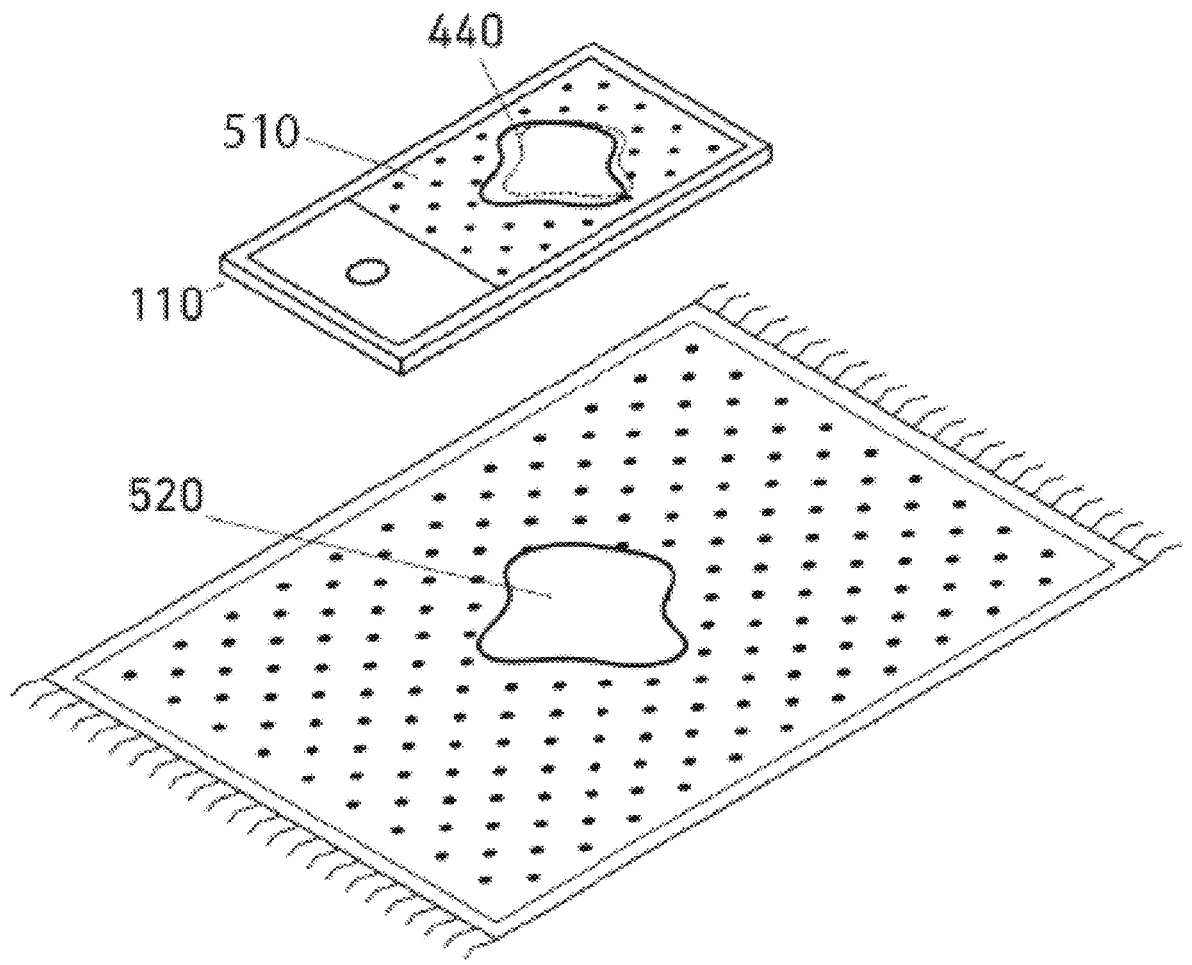
FIG. 5 is an illustration of a smartphone device capturing a candidate image of a candidate object.

FIG. 5 shows the beginning of the candidate capture process. The candidate capture process is utilized to capture an image of an object so that it can be matched to the collectible to verify whether they represent the same physical object. FIG. 5 shows a smartphone device 110 capturing a candidate image 510 of a candidate object 520. The candidate image 510 is shown with a golden cutout 440 overlayed on the display to assist in the alignment of the camera to the candidate object 520.

Figure 6:
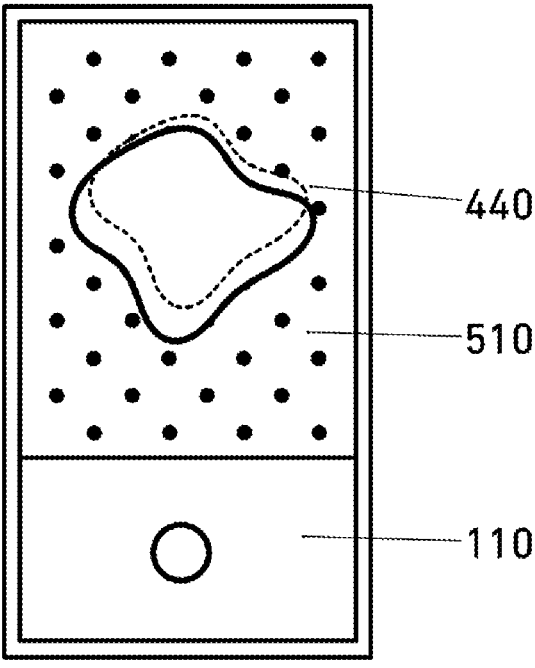
FIG. 6 is an illustration of a smartphone device capturing a candidate image.

FIG. 6 is a front view of the smartphone device 110 displaying the candidate image 510 with the golden cutout 440 overlayed on the display.

Figure 7:
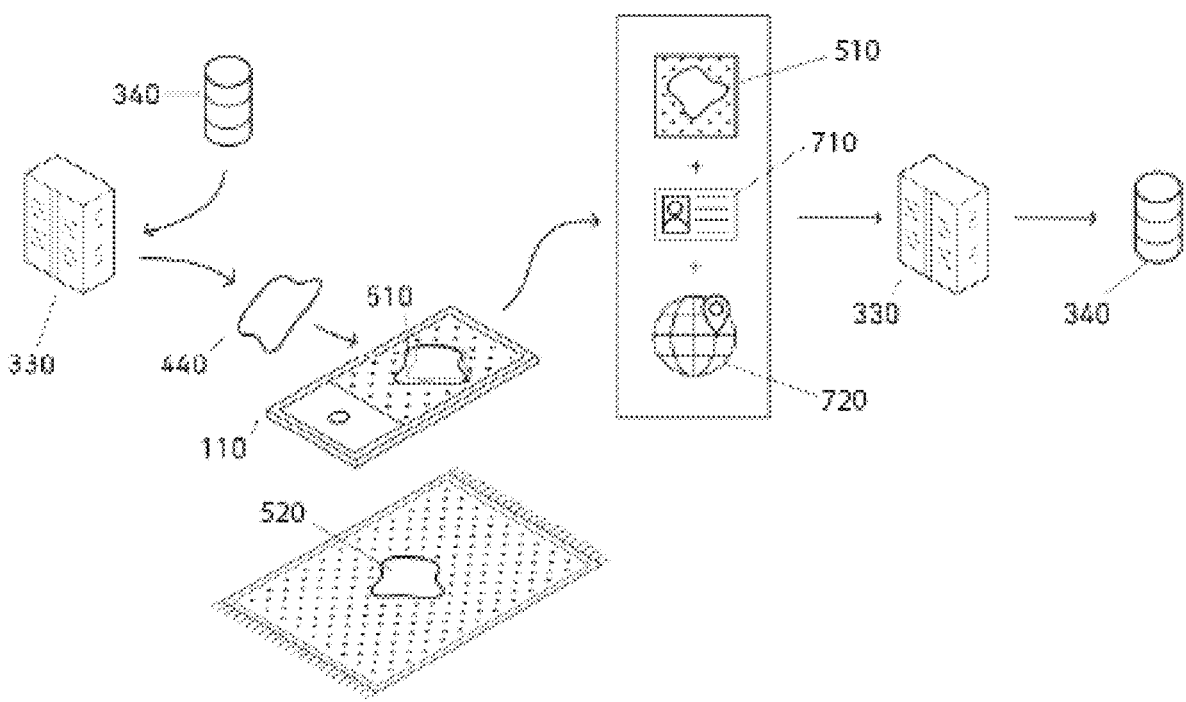
FIG. 7 is a flow diagram showing the candidate capture process.

FIG. 7 shows the candidate capture process wherein the smartphone device 110 captures a candidate image 510 of a candidate object 520. The candidate image 520 is shown with a golden cutout 440 overlayed on the display. The smartphone device 110 is communicatively connected to the Platform and through the app sends the candidate image 510, verifier ID information 710 and candidate geolocation 720 to backend server 330, which then stores the candidate image 510, verifier ID information 710 and candidate geolocation 720 into a datastore 340. In one embodiment, the candidate image 510 is stored in an object storage for performance and scalability, and the verifier ID information 710 and candidate geolocation 720 and a pointer to the object storage location of the candidate image 510 are stored in a NoSQL or relational database. In one embodiment, the app captures the candidate image 510 when the verifier presses the camera button. In one embodiment, the app determines when the optimal alignment is reached and automatically triggers the camera component of the smartphone device 110 operating system to capture the candidate image 510.

Figure 8:
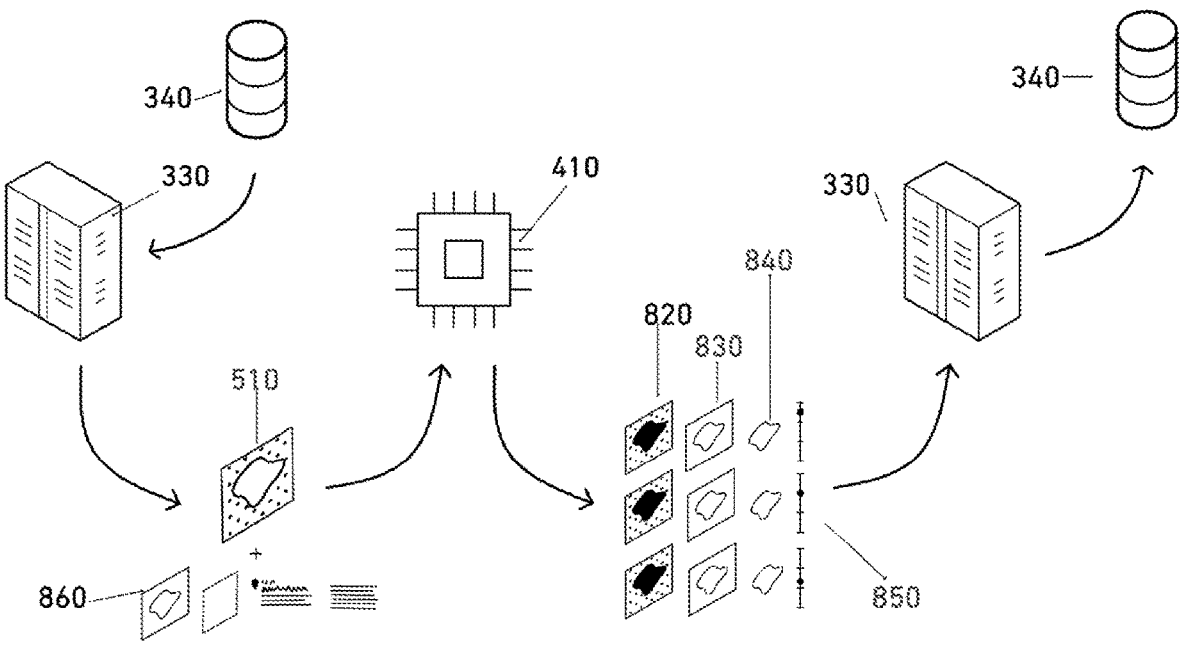
FIG. 8 is a flow diagram showing the candidate masking process.

FIG. 8 shows the candidate masking process. In one embodiment, this process is triggered when the candidate image 510 is received by the backend server 330. In one embodiment, the candidate masking process is run asynchronously. The candidate masking process generates a candidate mask which comprises a candidate segment image 820, a candidate segment mask 830 and a candidate segment cutout 840. In one embodiment, the segmentation component also returns a confidence factor 850 for each candidate segment mask. In one embodiment, multiple candidate segment images 820, candidate segment masks 830, and candidate segment cutouts 840 are generated, the backend server 330 selects the candidate segment image 820, candidate segment mask 830 and candidate segment cutout 840 that has the highest candidate confidence factor 850 returned by the segmentation component 410. The candidate masking process starts with the backend server 330 sending the candidate image 510 and at least one candidate prompt 860 to the segmentation component 410 for processing. The segmentation component 410 then returns a candidate mask comprising a candidate segment image 820, a candidate segment mask 830 and a candidate segment cutout 840, or in one embodiment as shown, multiple candidate segment images 820, candidate segment masks 830, candidate segment cutouts 840, and candidate confidence factors 850, which are sent back to the backend server 330. If one candidate segment image 820, candidate segment mask 830 and candidate segment cutout 840 are returned, then the candidate segment image 820, candidate segment mask 830 and candidate segment cutout 840 are stored in the datastore 340. If multiple candidate segment images 820, candidate segment masks 830, candidate segment cutouts 840, and candidate confidence factors 850 are returned, the backend server 330 selects the candidate segment image 820, candidate segment mask 830 and candidate segment cutout 840 that has the highest candidate confidence factor 850 returned by the segmentation component 410.

Continuing with FIG. 8, in one embodiment, the segmentation component 410 utilizes a process in computer vision where the candidate image 410 is divided into multiple segments (or sets of pixels), with each segment representing a distinct object or part of the image. The goal is to simplify or change the representation of an image into something more meaningful and extract the collectible from the background. In one embodiment, semantic segmentation is utilized wherein pixels are categorized into predefined classes. In one embodiment, instance segmentation is utilized wherein individual object instances are distinguished.

Continuing with FIG. 8, models utilized by the segmentation component 410, especially those based on the transformer architecture or fine-tuned versions of popular vision models, can leverage prompts or additional information to better guide their outputs. By passing relevant prompts, the segmentation component 410 can get a clearer idea of what the collectible is, leading to more accurate or contextually appropriate segmentations. If the segmentation component is aware of the specific domain or context of the image, it can adjust its segmentation strategy accordingly. Additionally, for models that might overfit to certain patterns or lack exposure to varied data, prompts can help the segmentation component 410 generalize better by providing hints or directions. In one embodiment, the at least one prompt 460 comprises the candidate image 510, the golden mask, the description of features on the origin image, and locations of the features on the origin image.

Figure 9:
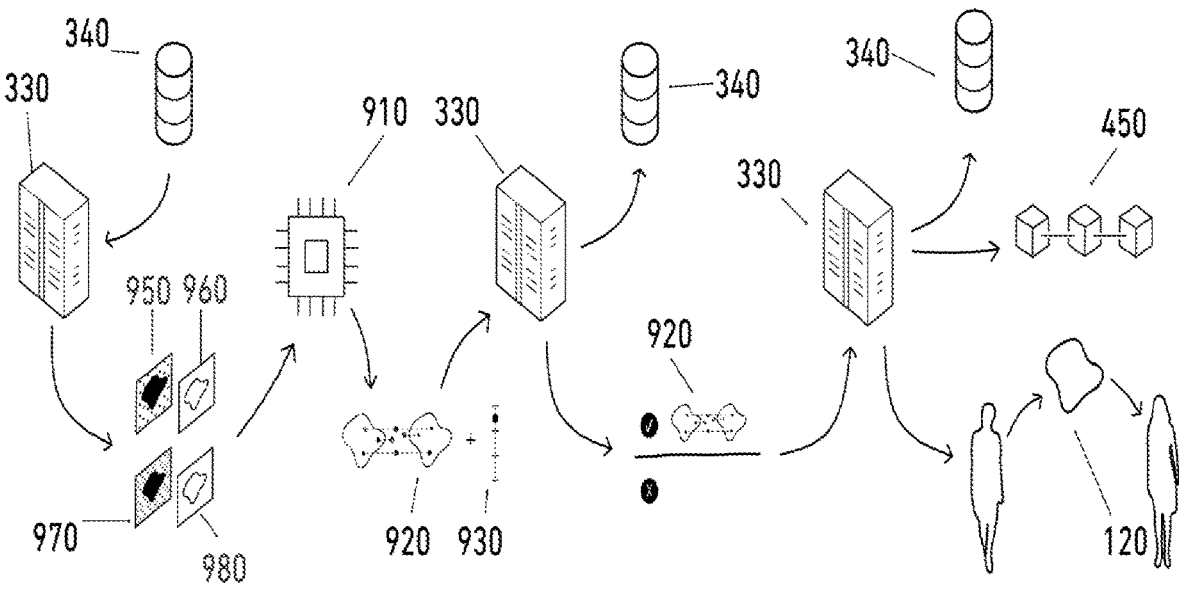
FIG. 9 is a flow diagram showing the matching process.

FIG. 9 shows the matching process wherein the system compares the candidate image 970 and golden image 950 to determine if the candidate image 970 is a valid representation of the collectible. The backend server 330 retrieves the golden image 950, golden mask 960, candidate image 970 and candidate segment mask 980 from the datastore 340 and submits the golden image 950, golden mask 960, candidate image 970 and candidate segment mask 980 to a matching component 910 for processing. The matching component 910 processes the inputs and returns a match image 920 and confidence factor 930 to the backend server 330, which then stores the match image 920 and confidence factor 930 in the datastore 340. The backend server 330 then compares the confidence factor 930 to a confidence threshold. If the confidence factor 930 exceeds the confidence threshold, it is considered a match, and the backend server 330 designates the candidate image 970 as the new golden image and the candidate segment mask 980 as the new golden mask. The backend server 330 then stores the verifier ID information, the candidate geolocation, the new golden image 970 and the match image 920 to the blockchain 450.

Figure 10:
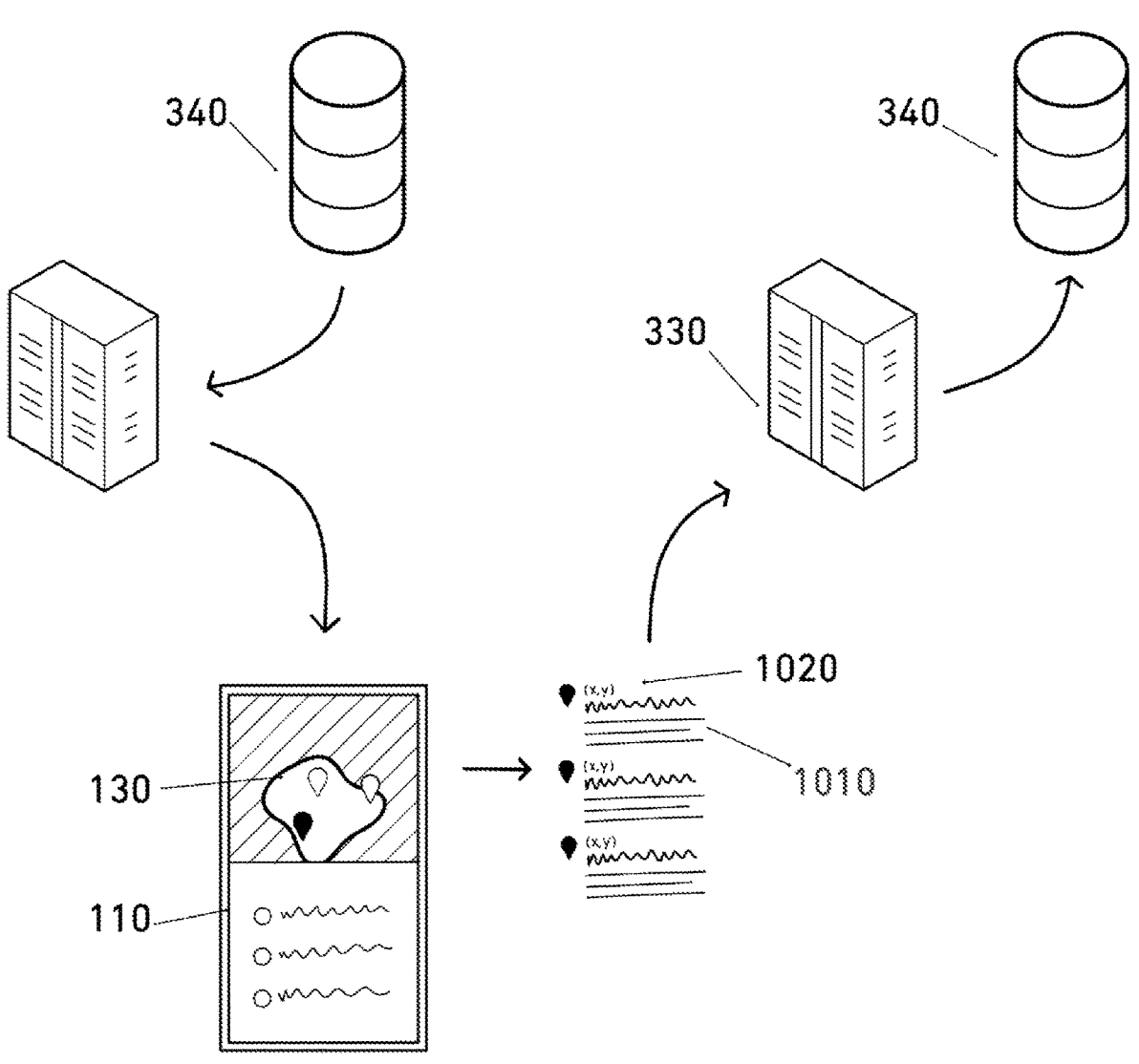
FIG. 10 is a flow diagram showing the feature identification process.

FIG. 10 shows the process of feature identification. As discussed with regard to FIG. 4 and FIG. 8, feature descriptions 1010 and feature locations 1020 can be effective data points to provide in a prompt to a segmentation component. FIG. 4 describes capturing the origin image 130 and submitting it to a segmentation component with at least one prompt. In one embodiment, that at least one prompt includes at least one feature description 1010 and feature location 1020. After the origin image 130 is captured as shown in FIG. 4, the backend server 330 retrieves the origin image 130 from the datastore 340 and transmits it back to the app on the smartphone device 110. The app is configured to allow the originator to drop pins denoting feature locations 1020 in an overlay of the origin image 130 displayed on the smartphone device 110. Additionally, the app is configured to allow the originator to add a feature description 1010 associated with each feature location 1020. The app is communicatively connected to the backend server 330, and transmits each feature location 1020 and each feature description 1010 to the backend server 330 which then stores each feature location 1020 and each feature description 1010 in the datastore.

Figure 11:
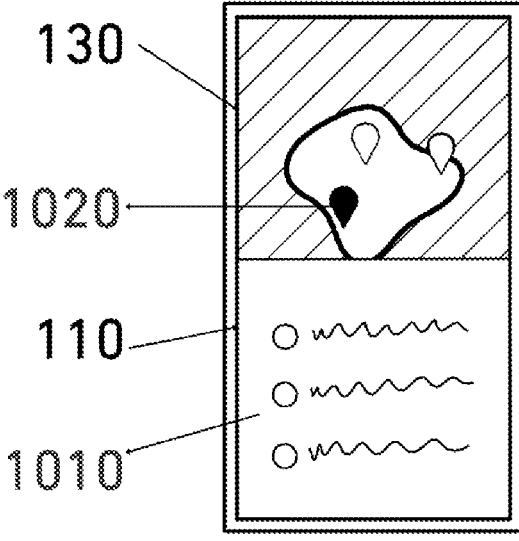
FIG. 11 is an illustration of a smartphone device identifying feature descriptions and feature locations.

FIG. 11 shows the smartphone device 110 displaying the interface for identifying features on the origin image 130. The app is configured to allow the originator to drop pins denoting feature locations 1020 in an overlay of the origin image 130 displayed on the smartphone device 110. Additionally, the app is configured to allow the originator to add a feature description 1010 associated with each feature location 1020.

Figure 12:
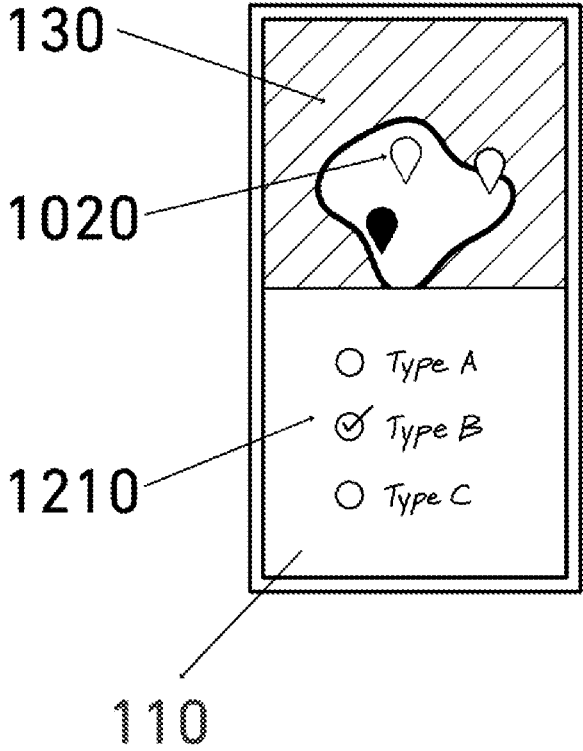
FIG. 12 is an illustration of a smartphone device identifying feature categories.

FIG. 12 shows the smartphone device 110 displaying the interface for identifying features on the origin image 130 that also includes associating a feature category 1210 with each feature. In one embodiment, the feature identification process includes associating a feature category with a feature description and feature location 1020, which may be included in a prompt to a segmentation component.

Figure 13:
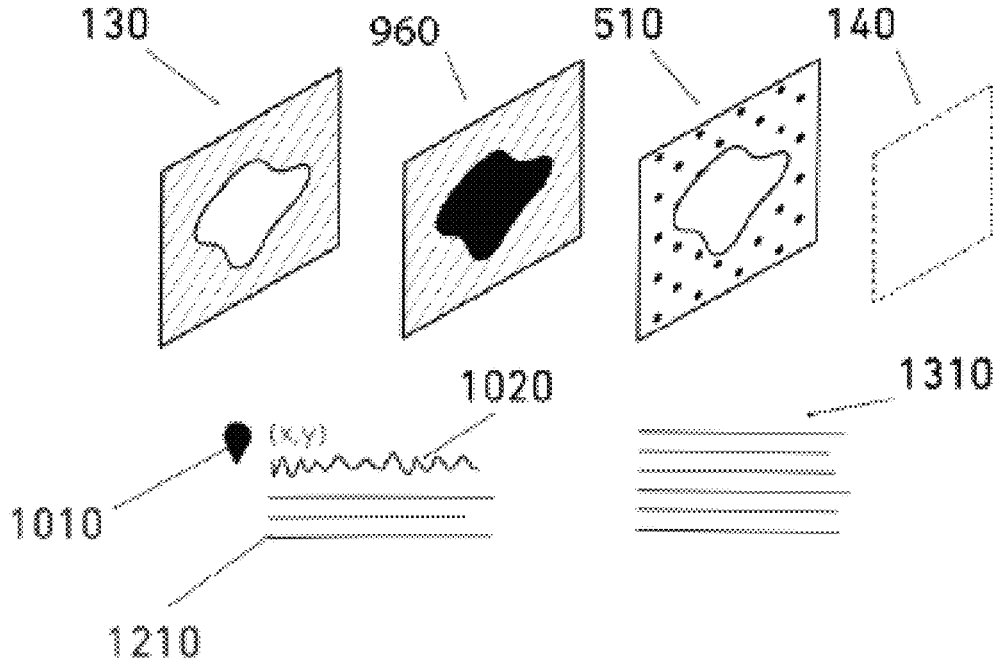
FIG. 13 is an illustration of a plurality of prompts.

FIG. 13 shows a plurality of prompts that can be used to optimize the results from a segmentation component. When generating a segment mask, it would be advantageous to provide some combination of the following as a prompt to the segmentation component, such as the origin image 130, the bounding box 140, a feature description of each feature 1010, a feature location of each feature 1020, a feature category of each feature 1210, and an origin story 1310 providing a narrative background about the collectible. When generating a candidate segment mask, it would be advantageous to provide some combination of the following as a prompt to the segmentation component, such as the candidate image 510, the latest golden mask 960, the bounding box 140, a feature description of each feature 1010, a feature location of each feature 1020, a feature category of each feature 1210, and an origin story 1310 providing a narrative background about the collectible.

Figure 14:
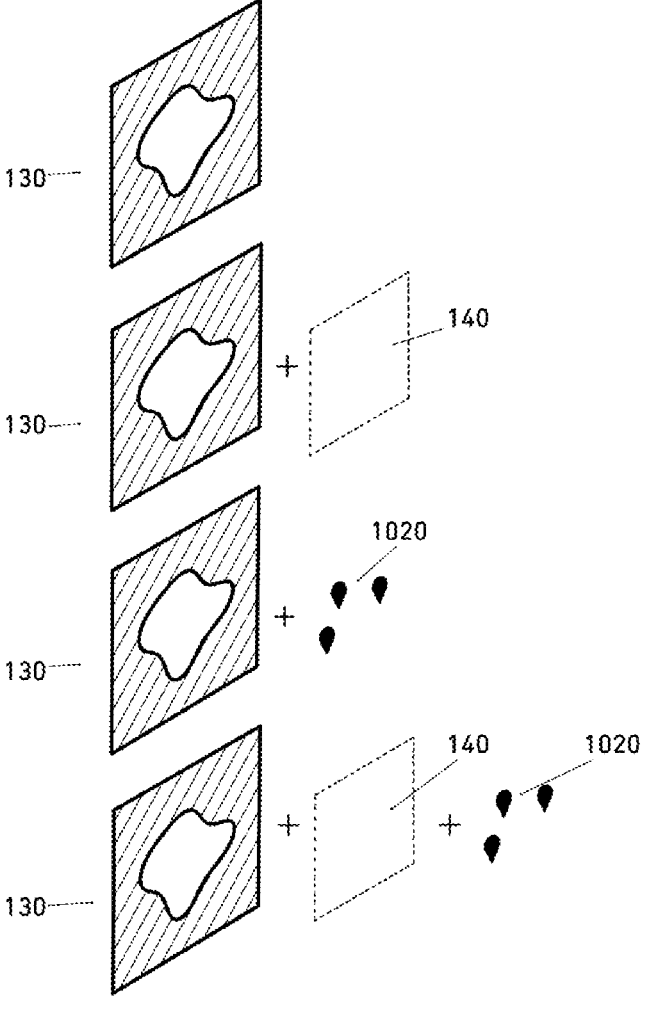
FIG. 14 illustrates a plurality of segmentation algorithms.

FIG. 14 shows some of the algorithms that can be run by the segmentation component, described from top to bottom as zero shot algorithm which includes as a prompt the origin image 130; box algorithm which includes as a prompt the origin image 130 and bounding box 140; points algorithm which includes as a prompt the origin image 130 and feature locations 1020; and points box algorithm which includes as a prompt the origin image 130, feature locations 1020, bounding box 140.

Figure 15:
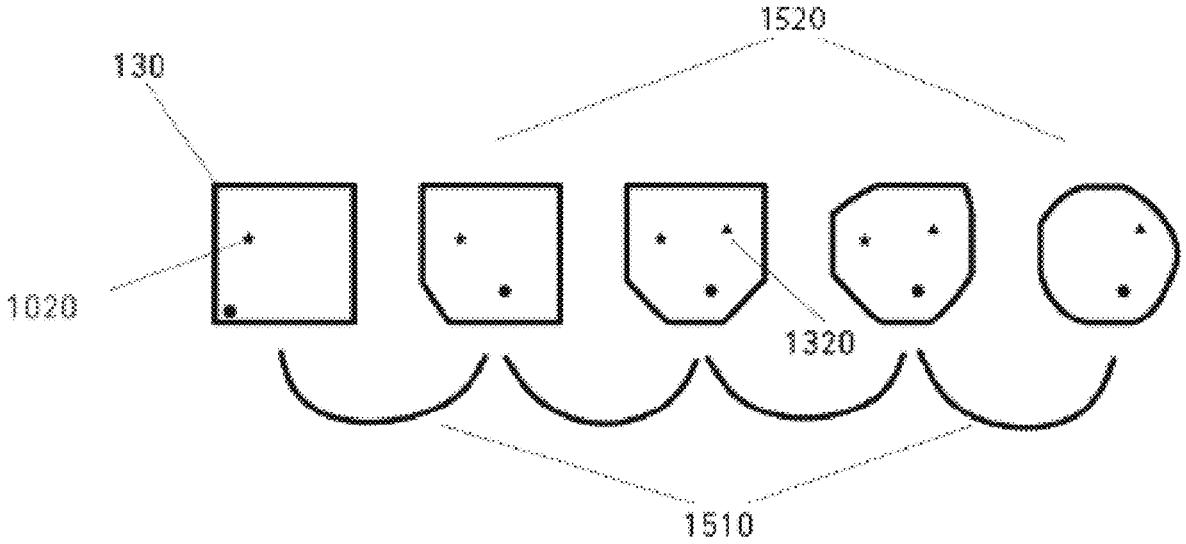
FIG. 15 is a diagram illustrating the immutable chain of object provenance.

FIG. 15 illustrates how the immutable chain of physical object provenance can utilize the blockchain to track the lifecycle of a physical object as it changes over time and ensuring its provenance. The origin image 130 is entered onto the blockchain with identifying feature locations 1020. When the subsequent rescans 1520 are done, changed features 1320 are noted, and the matching process 1510 ensures the authenticity of provenance. Each successful candidate image becomes the golden image against which the next rescan is matched. The blockchain retains the entire history as the collectible changes over time.

Figure 16:
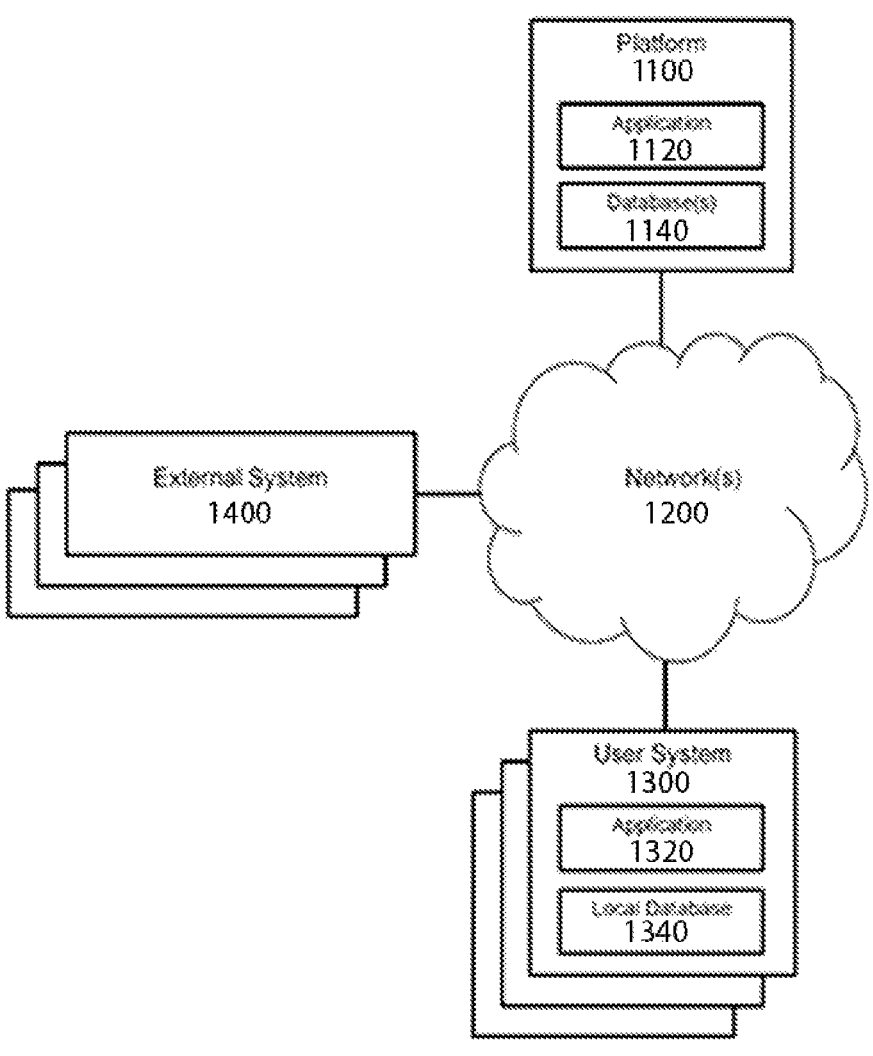
FIG. 16 is a block diagram of a computer network.

FIG. 16 illustrates an example infrastructure in which one or more of the disclosed processes may be implemented, according to an embodiment. The infrastructure may comprise a platform 1100 (e.g., one or more servers) which hosts and/or executes one or more of the various functions, processes, methods, and/or software modules described herein. Platform 1100 may comprise dedicated servers, or may instead comprise cloud instances, which utilize shared resources of one or more servers. These servers or cloud instances may be collocated and/or geographically distributed. Platform 1100 may also comprise or be communicatively connected to a server application 1120 and/or one or more databases 1140. In addition, platform 1100 may be communicatively connected to one or more user systems 1300 via one or more networks 1200. Platform 1100 may also be communicatively connected to one or more external systems 1400 (e.g., other platforms, websites, etc.) via one or more networks 1200.

Continuing with FIG. 16, network(s) 1200 may comprise the Internet, and platform 1100 may communicate with user system(s) 1300 through the Internet using standard transmission protocols, such a s HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 1100 is illustrated as being connected to various systems through a single set of network(s) 1200, it should be understood that platform 1100 may be connected to the various systems via different sets of one or more networks. For example, platform 1100 may be connected to a subset of user systems 1300 and/or external systems 1400 via the Internet, but may be connected to one or more other user systems 1300 and/or external systems 1400 via an intranet. Furthermore, while only a few user systems 1300 and external systems 1400, one server application 1120, and one set of database(s) 1140 are illustrated, it should be understood that the infrastructure may comprise any number of user systems, external systems, server applications, and databases.

Continuing with FIG. 16, user system(s) 1300 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and/or the like.

Continuing with FIG. 16, the platform may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 1100 transmits or serves one or more screens of the graphical user interface in response to requests from user system(s) 1300. In some embodiments, these screens may be served in the form of a wizard, in which case two or more screens may be served in a sequential manner, and one or more of the sequential screens may depend on an interaction of the user or user system 1300 with one or more preceding screens. The requests to platform 1100 and the responses from platform 1100, including the screens of the graphical user interface, may both be communicated through network(s) 1200, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 1140) that are loc ally and/or remotely accessible to platform 1100. Platform 1100 may also respond to other requests from user system(s) 1300.

Continuing with FIG. 16, the platform may further comprise, be communicatively coupled with, or otherwise have access to one or more database(s) 1140. For example, platform 1100 may comprise one or more database servers which manage one or more databases 1140. A user system 1300 or server application 1120 executing on platform 1100 may submit data (e.g., user data, form data, etc.) to be stored in database(s) 1140, and/or request access to data stored in database(s) 1140. Any suitable database may be utilized, including without limitation MySQL™, Oracle™, IBM™, Microsoft SQL™, Access™, PostgreSQL™, and the like, including cloud-based databases and proprietary databases. Data may be sent to platform 1100, for instance, using the well-known POST request supported by HTTP, via FTP, and/or the like. This data, as well as other requests, may be handled, for example, by server-side web technology, such as a servlet or other software module (e.g., comprised in server application 1120), executed by platform 110.

Continuing with FIG. 16, in embodiments in which a web service is provided, platform 1100 may receive requests from external system(s) 1400, and provide responses in extensible Markup Language (XML), JavaScript Object Notation (JSON), and/or any other suitable or desired format. In such embodiments, platform 1100 may provide an application programming interface (API) which defines the manner in which user system(s) 1300 and/or external system(s) 1400 may interact with the web service. Thus, user system(s) 1300 and/or external system(s) 1400 (which may themselves be servers), can define their own user interfaces, and rely on the web service to implement or otherwise provide the backend processes, methods, functionality, storage, and/or the like, described herein. For example, in such an embodiment, a client application 1320 executing on one or more user system(s) 1300 may interact with a server application 1120 executing on platform 1100 to execute one or more or a portion of one or more of the various functions, processes, methods, and/or software modules described herein. Client application 1320 may be "thin," in which case processing is primarily carried out server-side by server application 1120 on platform 1100. A basic example of a thin client application 1320 is a browser application, which simply requests, receives, and renders webpages at user system(s) 1300, while server application 1120 on platform 1100 is responsible for generating the webpages and managing database functions. Alternatively, the client application may be "thick," in which case processing is primarily carried out client-side by user system(s) 1300. It should be understood that client application 1320 may perform an amount of processing, relative to server application 1120 on platform 1100, at any point along this spectrum between "thin" and "thick," depending on the design goals of the particular implementation. In any case, the application described herein, which may wholly reside on either platform 1100 (e.g., in which case server application 1120 performs all processing) or user system(s) 1300 (e.g., in which case client application 1320 performs all processing) or be distributed between platform 1100 and user system(s) 1300 (e.g., in which case server application 1120 and client application 1320 both perform processing), can comprise one or more executable software modules that implement one or more of the processes, methods, or functions of the application described herein.

Figure 17:
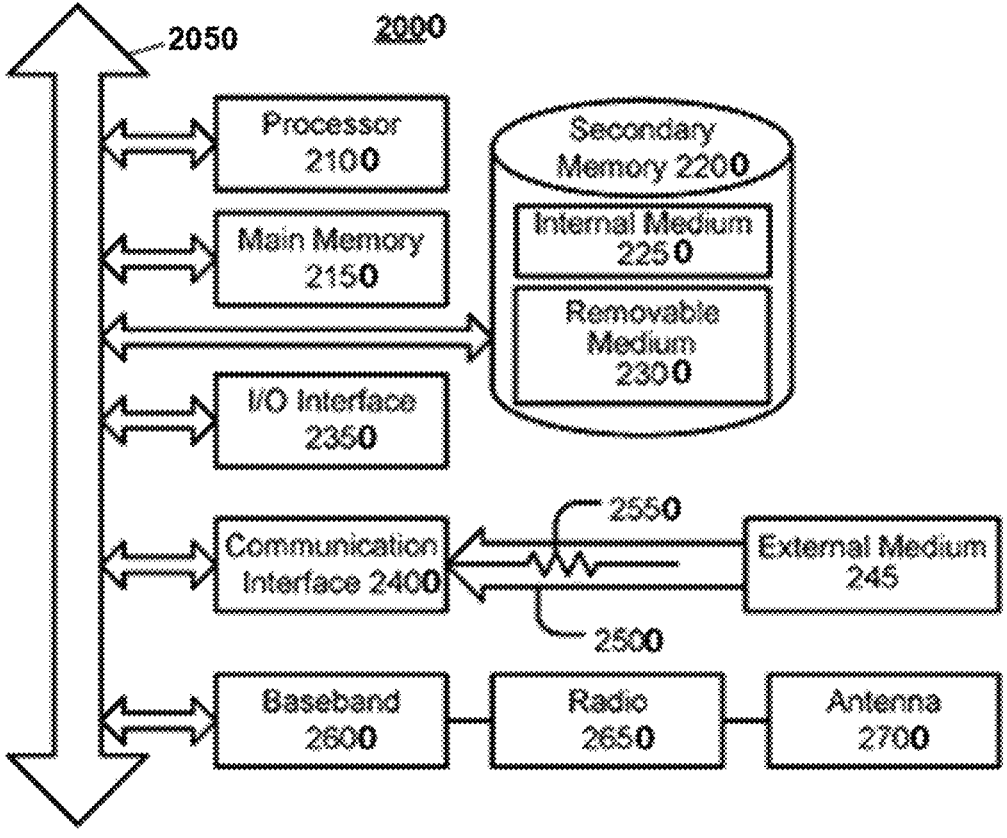
FIG. 17 is a block diagram of a computer.

FIG. 17 is a block diagram illustrating an example wired or wireless system 2000 that may be used in connection with various embodiments described herein. For example, system 2000 may be used as or in conjunction with one or more of the functions, processes, or methods (e.g., to store and/or execute the application or one or more software modules of the application) described herein, and may represent components of platform 1100, user system(s) 1300, external system(s) 1400, and/or other processing devices described herein. System 2000 can be a server or any conventional personal computer, or any other processor-enabled device that is capable of wired or wireless data communication. Other computer systems and/or architectures may be also used, as will be clear to those skilled in the art.

Continuing with FIG. 17, system 2000 preferably includes one or more processors, such as processor 2100. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 2100. Examples of processors which may be used with system 2000 include, without limitation, the Pentium® processor, Core i7® processor, and Xeon® processor, all of which are available from Intel Corporation of Santa Clara, California.

Continuing with FIG. 17, processor 2100 is preferably connected to a communication bus 2050. Communication bus 2050 may include a data channel for facilitating information transfer between storage and other peripheral components of system 2000. Furthermore, communication bus 2050 may provide a set of signals used for communication with processor 2100, including a data bus, address bus, and/or control bus (not shown). Communication bus 2050 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

Continuing with FIG. 17, system 2000 preferably includes a main memory 2150 and may also include a secondary memory 2200. Main memory 2150 provides storage of instructions and data for programs executing on processor 2100, such as one or more of the functions and/or modules discussed herein. It should be understood that programs stored in the memory and executed by processor 2100 may be written and/or compiled according to any suitable language, including without limitation C/C++, Java, JavaScript, Python, Ruby, Perl, Go, Visual Basic, .NET, and the like. Main memory 2150 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Continuing with FIG. 17, secondary memory 2200 may optionally include an internal medium 2250 and/or a removable medium 2300. Removable medium 2300 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Continuing with FIG. 17, secondary memory 2200 is a non-transitory computer-readable medium having computer-executable code (e.g., disclosed software modules) and/or other data stored thereon. The computer software or data stored on secondary memory 2200 is read into main memory 2150 for execution by processor 2100.

Continuing with FIG. 17, in alternative embodiments, secondary memory 2200 may include other similar means for allowing computer programs or other data or instructions to be loaded into system 2000. Such means may include, for example, a communication interface 2400, which allows software and data to be transferred from external storage medium 2450 to system 2000. Examples of external storage medium 245 may include an external hard disk drive, an external optical drive, an external magneto-optical drive, and/or the like. Other examples of secondary memory 2200 may include semiconductor-based memory, such as programmable read-only memory (PROM), erasable programmable read-only memory (EPROM), electrically erasable read-only memory (EEPROM), and flash memory (block-oriented memory similar to EEPROM).

Continuing with FIG. 17, as mentioned above, system 2000 may include a communication interface 2400. Communication interface 2400 allows software and data to be transferred between system 2000 and external devices (e.g. printers), networks, or other information sources. For example, computer software or executable code may be transferred to system 2000 from a network server (e.g., platform 1100) via communication interface 2400. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 2000 with a network (e.g., network(s) 1200) or another computing device. Communication interface 2400 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/ Internet protocol (TCP/IP), serial line Internet protocol/point to point protocol (SLIP/PPP), and so on, but may also implement customized or non-standard interface protocols as well.

Continuing with FIG. 17, software and data transferred via communication interface 2400 are generally in the form of electrical communication signals 2550. These signals 2550 may be provided to communication interface 2400 via a communication channel 2500. In an embodiment, communication channel 2500 may be a wired or wireless network (e.g., network(s) 1200), or any variety of other communication links. Communication channel 2500 carries signals 2550 and can be implemented using a variety of wired or wireless communication means including wire or cable, fiber optics, conventional phone line, cellular phone link, wireless data communication link, radio frequency ("RF") link, or infrared link, just to name a few.

Continuing with FIG. 17, computer-executable code (e.g., computer programs, such as the disclosed application, or software modules) is stored in main memory 2150 and/or secondary memory 2200. Computer programs can also be received via communication interface 2400 and stored in main memory 2150 and/or secondary memory 2200. Such computer programs, when executed, enable system 2000 to perform the various functions of the disclosed embodiments as described elsewhere herein.

Continuing with FIG. 17, in this description, the term "computer-readable medium" is used to refer to any non-transitory computer-readable storage media used to provide computer-executable code and/or other data to or within system 2000. Examples of such media include main memory 2150, secondary memory 2200 (including internal memory 2250, removable medium 2300, and external storage medium 2450), and any peripheral device communicatively coupled with communication interface 2400 (including a network information server or other network device). These non-transitory computer-readable media are means for providing executable code, programming instructions, software, and/or other data to system 2000.

Continuing with FIG. 17, in an embodiment that is implemented using software, the software may be stored on a computer-readable medium and loaded into system 2000 by way of removable medium 2300, I/O interface 2350, or communication interface 2400. In such an embodiment, the software is loaded into system 2000 in the form of electrical communication signals 2550. The software, when executed by processor 2100, preferably causes processor 2100 to perform one or more of the processes and functions described elsewhere herein.

Continuing with FIG. 17, in an embodiment, I/O interface 2350 provides an interface between one or more components of system 2000 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

Continuing with FIG. 17, system 2000 may also include optional wireless communication components that facilitate wireless communication over a voice network and/or a data network (e.g., in the case of user system 1300). The wireless communication components comprise an antenna system 2700, a radio system 2650, and a baseband system 2600. In system 2000, radio frequency (RF) signals are transmitted and received over the air by antenna system 2700 under the management of radio system 2650.

Continuing with FIG. 17, in an embodiment, antenna system 2700 may comprise one or more antennae and one or more multiplexors (not shown) that perform a switching function to provide antenna system 2700 with transmit and receive signal paths. In the receive path, received RF signals can be coupled from a multiplexor to a low noise amplifier (not shown) that amplifies the received RF signal and sends the amplified signal to radio system 2650.

Continuing with FIG. 17, in an alternative embodiment, radio system 2650 may comprise one or more radios that are configured to communicate over various frequencies. In an embodiment, radio system 2650 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 2650 to baseband system 2600.

Continuing with FIG. 17, if the received signal contains audio information, then baseband system 2600 decodes the signal and converts it to an analog signal. Then the signal is amplified and sent to a speaker. Baseband system 2600 also receives analog audio signals from a microphone. These analog audio signals are converted to digital signals and encoded by baseband system 2600. Baseband system 2600 also encodes the digital signals for transmission and generates a baseband transmit audio signal that is routed to the modulator portion of radio system 2650. The modulator mixes the baseband transmit audio signal with an RF carrier signal, generating an RF transmit signal that is routed to antenna system 2700 and may pass through a power amplifier (not shown). The power amplifier amplifies the RF transmit signal and routes it to antenna system 2700, where the signal is switched to the antenna port for transmission.

Continuing with FIG. 17, baseband system 2600 is also communicatively coupled with processor 2100, which may be a central processing unit (CPU). Processor 2100 has access to data storage areas 2150 and 2200. Processor 2100 is preferably configured to execute instructions (i.e., computer programs, such as the disclosed application, or software modules) that can be stored in main memory 2150 or secondary memory 2200. Computer programs can also be received from baseband processor 2600 and stored in main memory 2100 or in secondary memory 2200, or executed upon receipt. Such computer programs, when executed, enable system 200 to perform the various functions of the disclosed embodiments.

Continuing with FIG. 17, embodiments of systems and methods for a personal diagnostic platform will now be described in detail. It should be understood that the described processes may be embodied in one or more software modules that are executed by one or more hardware processors (e.g., processor 2100), for example, as the application discussed herein (e.g., server application 1120, client application 1320, and/or a distributed application comprising both server application 1120 and client application 1320), which may be executed wholly by processor(s) of platform 1100, wholly by processor(s) of user system(s) 1300, or may be distributed across platform 1100 and user system(s) 1300, such that some portions or modules of the application are executed by platform 1100 and other portions or modules of the application are executed by user system(s) 1300. The described processes may be implemented as instructions represented in source code, object code, and/or machine code. These instructions may be executed directly by hardware processor(s) 2100, or alternatively, may be executed by a virtual machine operating between the object code and hardware processors 2100. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Figure 18:
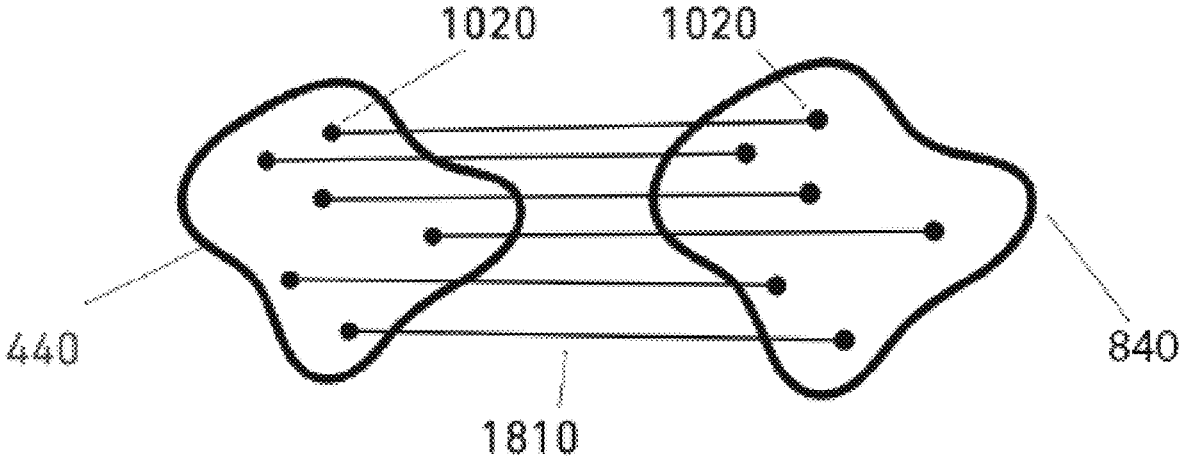
FIG. 18 is a block diagram of matching points of interest.

FIG. 18 shows matching points of interest 1810 that can be detected in the matching process by the matching component. The matching points of interest 1810 are feature locations 1020 present on the golden cutout 440 and the candidate segment cutout 840.

Figure 19:
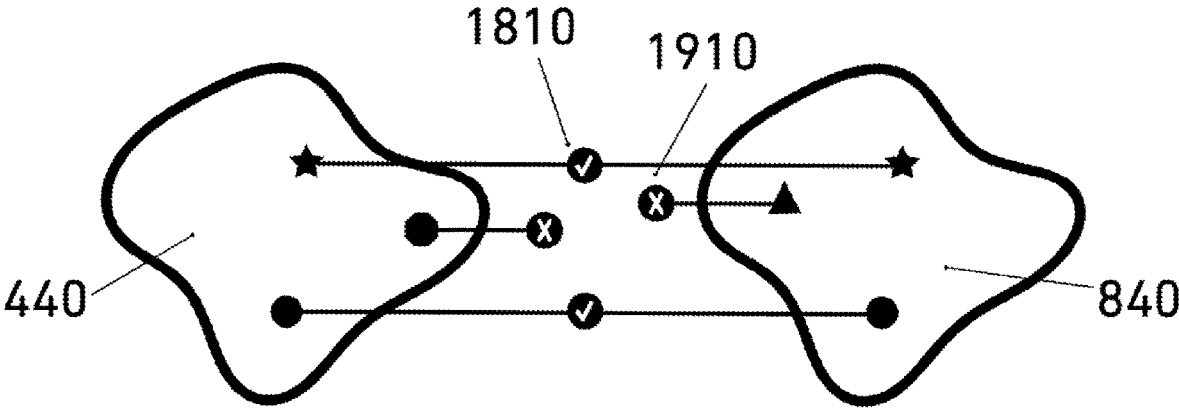
FIG. 19 is a block diagram of matching and non-matching points of interest.

FIG. 19 shows reverse matching of the points of interest where the golden cutout 440 is matched against the candidate cutout 840, and denoting the successful matching of features 1810, and also denoting the non-matching points of interest 1910. The matching component computes a second iteration of the homography from the golden cutout to the candidate cutout using only the best points from the 1st iteration, and also in reverse (3rd iteration, candidate cutout to the golden cutout). A forward homography detects if objects were removed, and the reverse homography detects if objects were added. Points of interest detected in the previously approved cutout but not in the newly scanned image's cutout are understood to have been removed. Points of interest detected in the newly scanned image's cutout that are not present in the previously approved cutout are understood to have been added.

Figure 20:
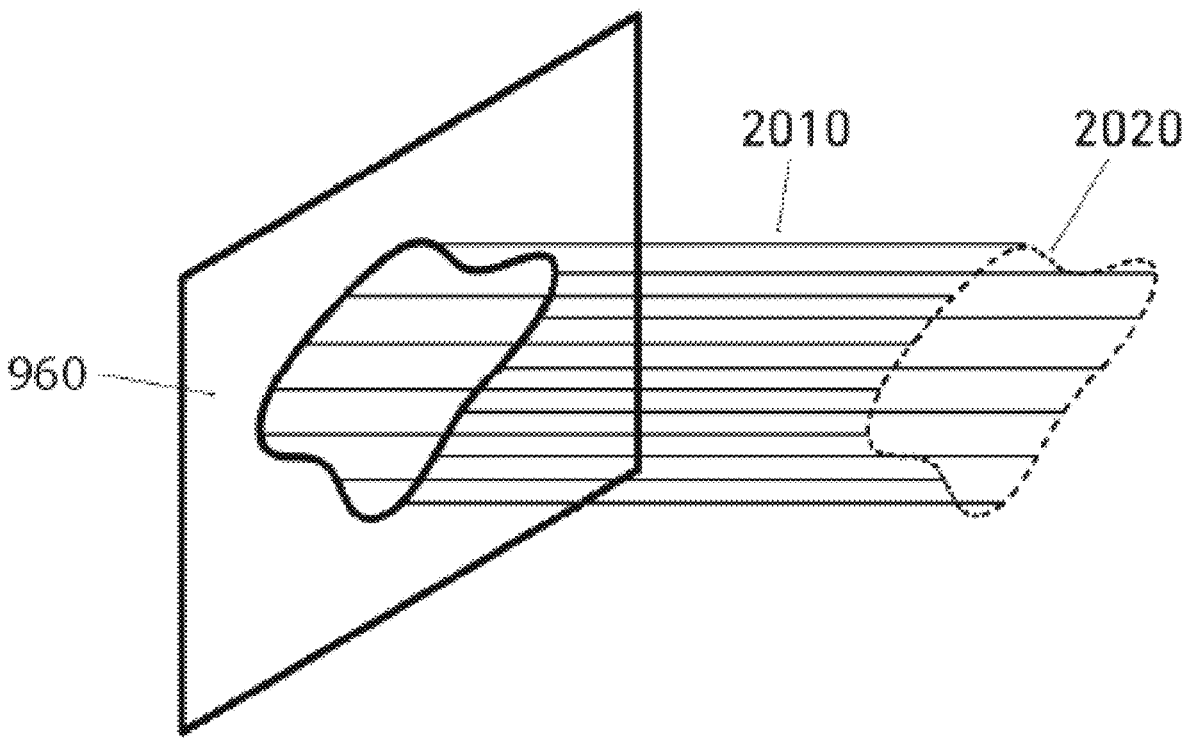
FIG. 20 is a block diagram of an auto-generated transform mask.

FIG. 20 shows the auto-generated mask 2020 from transformed golden mask 1310. The homography based translation 2010 of the golden mask 960 edges auto-generates the auto-generated mask 2020. When the candidate mask is not available, the matching component can transform the golden mask 960 pixel locations into the image space of the candidate image using the homography measured using a first round of the feature matching process. The backend server evaluates the output mask confidence based on the similarity of the area between the two masks. Using the detected feature homography translation as the recipe, the previously approved mask is transformed.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

The systems and methods described below consist of several different platforms, processes, and hardware components working together to provide a comprehensive personal diagnostic platform that also allows for robust contact tracing. These components include a smart diagnostic platform, a personal diagnostic device that can interface with the platform to provide medical data, and a guest tracking system that will track guests and that can be used to monitor capacity limits, enforce distancing protocols and perform contact tracing when needed.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

It should be further understood that the examples and embodiments pertaining to the systems and methods disclosed herein are not meant to limit the possible implementations of the present technology. Further, although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the Claims.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method for verifying the provenance of a collectible, the method comprising:
    performing the processing of an origin image of a collectible, wherein the performing the processing of the origin image comprises:
    receiving an originator ID information;
    capturing the origin image of the collectible;
    receiving an origin geolocation associated with the collectible;
    storing the originator ID information, the origin geolocation, and the origin image in a datastore; and
    performing the identification of an at least one feature of the collectible, wherein the performing the identification of the at least one feature comprises:

receiving a feature description of each feature identified on the origin image;

receiving feature location for each feature identified on the origin image; and storing each feature description and each feature location in the datastore;

performing the generation of a segment mask of the origin image to isolate the collectible from a background, wherein the performing the generation of the segment mask comprises:

transmitting the origin image and at least one prompt to a segmentation component to perform a segmentation analysis;

receiving a segment image, a segment mask and a segment cutout from the segmentation component;

storing the segment image, the segment mask and the segment cutout in the datastore;

designating the segment mask as a golden mask and the origin image as a golden image;

storing the originator ID information, the origin geolocation, the golden image, and each prompt on a blockchain;

performing the processing of a candidate image of a candidate object, wherein the performing of the processing of the candidate image comprises:

receiving a verifier ID information of a verifier submitting the candidate image;

capturing the candidate image of the candidate object;

receiving a candidate geolocation associated with the candidate object;

storing the verifier ID information, the candidate geolocation, and the candidate image in the datastore;

performing the generation of a candidate segment mask of the candidate image to isolate the candidate object from the background, wherein the performing the generation of the candidate segment mask comprises:

transmitting the candidate image and an at least one candidate prompt to the segmentation component to perform a segmentation analysis;

receiving a candidate segment image, a candidate segment mask and a candidate segment cutout from the segmentation component;

storing the candidate segment image, the candidate segment mask and the candidate segment cutout in the datastore;

performing a matching of the golden image and the candidate image to verify that the collectible and candidate object are the same physical object, wherein the performing of the matching comprises:

submitting the golden image, golden mask, candidate image, and candidate segment mask to a matching component;

receiving a match image and a confidence factor from the matching component;

comparing the confidence factor with a confidence threshold; and if the confidence factor exceeds the confidence threshold, designating the candidate segment mask as the golden mask and the candidate image as a golden image;

storing the verifier ID information, the candidate geolocation, the golden image, and the match image on the blockchain;

performing an update to the datastore and the blockchain when there has been an addition of at least one update feature of the collectible, wherein the performing of an update comprises:

receiving an updater ID information of an updater submitting an update image of an update object;

capturing the update image of the update object;

receiving an update geolocation associated with the update object;

storing the updater ID information, the update geolocation, and the update image in the datastore;

performing the identification of an at least one update feature of the collectible, wherein the performing the identification of the at least one update feature comprises:

receiving an update feature description of each update feature identified on the update image;

receiving an update feature location for each update feature identified on the update image;

storing each update feature description and each update feature location in the datastore;

performing the generation of an update segment mask of the update image to isolate the update object from the background, wherein the performing the generation of the update segment mask comprises:

transmitting the update image, the golden mask, and each update feature location to the segmentation component to perform a segmentation analysis;

receiving an update segment image, an update segment mask and an update segment cutout from the segmentation component;

storing the update segment image, the update segment mask and the update segment cutout in the datastore;

performing a matching of the golden image and the update image to verify that the collectible and update object are the same physical object, wherein the performing of the matching comprises:

submitting the golden image, golden mask, the update image, and the update segment mask to the matching component;

receiving an update match image and an update confidence factor from the matching component;

comparing the update confidence factor with an update confidence threshold; and if the update confidence factor exceeds the update confidence threshold, designating the update segment mask as the golden mask and the update image as a golden image;

storing the updater ID information, the update geolocation, the golden image, and the update match image on the blockchain.

2. The method of claim 1, wherein the originator ID information, the origin image, the origin geolocation, the feature description of each feature, the feature location for each feature, the verifier ID information, the candidate image and the candidate geolocation are received from a smartphone device equipped with a camera component, a geolocation component, and an authentication component.

3. The method of claim 1, wherein the at least one prompt includes the origin image, the feature description of each feature, and the feature location of each feature; and wherein the at least one candidate prompt includes the candidate image, the golden mask, the feature description of each feature, and the feature location of each feature.

4. The method of claim 1, wherein the performing of the matching further comprises comparing the candidate geolocation with a candidate geolocation threshold, and proceeding to assess the confidence factor if the candidate geolocation threshold is exceeded.

5. The method of claim 1, wherein the performing the processing of the origin image further comprises receiving an origination date, the performing of the processing of the candidate image further comprises receiving a candidate date, and the performing of the matching further comprises comparing the origination date and the candidate date with a temporal threshold, and proceeding to assess the confidence factor if the temporal threshold is exceeded.

6. The method of claim 1, wherein the performing the generation of the segment mask further comprises instructing the segmentation component to utilize a plurality of algorithms and to return a segment image(n), a segment mask(n), a segment cutout(n), and a segment confidence factor(n) resulting from each algorithm run for the segment mask and to designate the segment image(n), segment mask(n), and segment cutout(n) with the highest associated segment confidence factor(n) as the segment image, segment mask, and segment cutout; and wherein the performing the generation of the candidate segment mask further comprises instructing the segmentation component to utilize a plurality of algorithms and to return a candidate segment image(n), a candidate segment mask(n), a candidate segment cutout(n), and a candidate segment confidence factor(n) resulting from each algorithm run for the candidate segment mask and to designate the candidate segment image(n), candidate segment mask(n), and candidate segment cutout(n) with the highest associated candidate segment confidence factor(n) as the candidate segment image, candidate segment mask, and candidate segment cutout.

7. A system for verifying the provenance of a collectible, comprising:

one or more memories; and one or more processors communicatively coupled to the one or more memories, configured to:

process an origin image of a collectible, wherein the processing of the origin image comprises:

receiving an originator ID information;

capturing the origin image of the collectible;

receiving an origin geolocation associated with the collectible;

storing the originator ID information, the origin geolocation, and the origin image in a datastore; and identification of an at least one feature of the collectible, wherein the identification of the at least one feature comprises:

receiving a feature description of each feature identified on the origin image;

receiving feature location for each feature identified on the origin image; and storing each feature description and each feature location in the datastore;

generate a segment mask of the origin image to isolate the collectible from a background, wherein the generation of the segment mask comprises:

transmitting the origin image and at least one prompt to a segmentation component to perform a segmentation analysis;

receiving a segment image, a segment mask and a segment cutout from the segmentation component;

storing the segment image, the segment mask and the segment cutout in the datastore;

designating the segment mask as a golden mask and the origin image as a golden image;

store the originator ID information, the origin geolocation, the golden image, and each prompt on a blockchain;

process a candidate image of a candidate object, wherein the processing of the candidate image comprises:

receiving a verifier ID information of a verifier submitting the candidate image;

capturing the candidate image of the candidate object;

receiving a candidate geolocation associated with the candidate object;

storing the verifier ID information, the candidate geolocation, and the candidate image in the datastore;

generate a candidate segment mask of the candidate image to isolate the candidate object from the background, wherein the generation of the candidate segment mask comprises:

transmitting the candidate image and an at least one candidate prompt to the segmentation component to perform a segmentation analysis;

receiving a candidate segment image, a candidate segment mask and a candidate segment cutout from the segmentation component;

storing the candidate segment image, the candidate segment mask and the candidate segment cutout in the datastore;

match the golden image and the candidate image to verify that the collectible and candidate object are the same physical object, wherein the matching comprises:

submitting the golden image, golden mask, candidate image, and candidate segment mask to a matching component;

receiving a match image and a confidence factor from the matching component;

comparing the confidence factor with a confidence threshold; and if the confidence factor exceeds the confidence threshold, designating the candidate segment mask as the golden mask and the candidate image as a golden image;

storing the verifier ID information, the candidate geolocation, the golden image, and the match image on the blockchain update the datastore and the blockchain when there has been an addition of at least one update feature of the collectible, wherein the updating comprises:

receiving an updater ID information of an updater submitting an update image of an update object;

capturing the update image of the update object;

receiving an update geolocation associated with the update object;

storing the updater ID information, the update geolocation, and the update image in the datastore;

identification of an at least one update feature of the collectible, wherein the identification of the at least one update feature comprises:

receiving an update feature description of each update feature identified on the update image;

receiving an update feature location for each update feature identified on the update image;

storing each update feature description and each update feature location in the datastore;

generation of an update segment mask of the update image to isolate the update object from the background, wherein the generation of the update segment mask comprises:

transmitting the update image, the golden mask, and each update feature location to the segmentation component to perform a segmentation analysis;

receiving an update segment image, an update segment mask and an update segment cutout from the segmentation component;

storing the update segment image, the update segment mask and the update segment cutout in the datastore;

match the golden image and the update image to verify that the collectible and update object are the same physical object, wherein the matching comprises:

submitting the golden image, golden mask, the update image, and the update segment mask to the matching component;

receiving an update match image and an update confidence factor from the matching component;

comparing the update confidence factor with an update confidence threshold; and if the update confidence factor exceeds the update confidence threshold, designating the update segment mask as the golden mask and the update image as a golden image;

storing the updater ID information, the update geolocation, the golden image, and the update match image on the blockchain.

8. The system of claim 7, wherein the originator ID information, the origin image, the origin geolocation, the feature description of each feature, the feature location for each feature, the verifier ID information, the candidate image and the candidate geolocation are received from a smartphone device equipped with a camera component, a geolocation component, and an authentication component.

9. The system of claim 7, wherein the at least one prompt includes the origin image, the feature description of each feature, and the feature location of each feature; and wherein the at least one candidate prompt includes the candidate image, the golden mask, the feature description of each feature, and the feature location of each feature.

10. The system of claim 7, wherein the matching further comprises comparing the candidate geolocation with a candidate geolocation threshold, and proceeding to assess the confidence factor if the candidate geolocation threshold is exceeded.

11. The system of claim 7, wherein the processing of the origin image further comprises receiving an origination date, the performing of the processing of the candidate image further comprises receiving a candidate date, and the performing of the matching further comprises comparing the origination date and the candidate date with a temporal threshold, and proceeding to assess the confidence factor if the temporal threshold is exceeded.

12. The system of claim 7, wherein the generation of the segment mask further comprises instructing the segmentation component to utilize a plurality of algorithms and to return a segment image(n), a segment mask(n), a segment cutout(n), and a segment confidence factor(n) resulting from each algorithm run for the segment mask and to designate the segment image(n), segment mask(n), and segment cutout (n) with the highest associated segment confidence factor(n) as the segment image, segment mask, and segment cutout; and wherein the performing the generation of the candidate segment mask further comprises instructing the segmentation component to utilize a plurality of algorithms and to return a candidate segment image(n), a candidate segment mask(n), a candidate segment cutout(n), and a candidate segment confidence factor(n) resulting from each algorithm run for the candidate segment mask and to designate the candidate segment image(n), candidate segment mask(n), and candidate segment cutout(n) with the highest associated candidate segment confidence factor(n) as the candidate segment image, candidate segment mask, and candidate segment cutout.

13. A non-transitory computer-readable medium with an executable program stored thereon, wherein the program instructs a processor connected to a network to perform operations comprising:

processing an origin image of a collectible, wherein the processing of the origin image comprises:

receiving an originator ID information;

capturing the origin image of the collectible;

receiving an origin geolocation associated with the collectible;

storing the originator ID information, the origin geolocation, and the origin image in a datastore; and identifying an at least one feature of the collectible, wherein the identifying of the at least one feature comprises:

receiving a feature description of each feature identified on the origin image;

receiving feature location for each feature identified on the origin image; and storing each feature description and each feature location in the datastore;

generating a segment mask of the origin image to isolate the collectible from a background, wherein the generation of the segment mask comprises:

transmitting the origin image and at least one prompt to a segmentation component to perform a segmentation analysis;

receiving a segment image, a segment mask and a segment cutout from the segmentation component;

storing the segment image, the segment mask and the segment cutout in the datastore;

designating the segment mask as a golden mask and the origin image as a golden image;

storing the originator ID information, the origin geolocation, the golden image, and each prompt on a blockchain;

processing a candidate image of a candidate object, wherein the processing of the candidate image comprises:

receiving a verifier ID information of a verifier submitting the candidate image;

capturing the candidate image of the candidate object;

receiving a candidate geolocation associated with the candidate object;

storing the verifier ID information, the candidate geolocation, and the candidate image in the datastore;

generating a candidate segment mask of the candidate image to isolate the candidate object from the background, wherein the generation of the candidate segment mask comprises:

transmitting the candidate image and an at least one candidate prompt to the segmentation component to perform a segmentation analysis;

receiving a candidate segment image, a candidate segment mask and a candidate segment cutout from the segmentation component;

storing the candidate segment image, the candidate segment mask and the candidate segment cutout in the datastore;

matching the golden image and the candidate image to verify that the collectible and candidate object are the same physical object, wherein the matching comprises:

submitting the golden image, golden mask, candidate image, and candidate segment mask to a matching component;

receiving a match image and a confidence factor from the matching component;

comparing the confidence factor with a confidence threshold; and if the confidence factor exceeds the confidence threshold, designating the candidate segment mask as the golden mask and the candidate image as a golden image;

storing the verifier ID information, the candidate geolocation, the golden image, and the match image on the blockchain updating the datastore and the blockchain when there has been an addition of at least one update feature of the collectible, wherein the updating comprises:

receiving an updater ID information of an updater submitting an update image of an update object;

capturing the update image of the update object;

receiving an update geolocation associated with the update object;

storing the updater ID information, the update geolocation, and the update image in the datastore;

identification of an at least one update feature of the collectible, wherein the identification of the at least one update feature comprises:

receiving an update feature description of each update feature identified on the update image;

receiving an update feature location for each update feature identified on the update image;

storing each update feature description and each update feature location in the datastore;

generating an update segment mask of the update image to isolate the update object from the background, wherein the generation of the update segment mask comprises:

transmitting the update image, the golden mask, and each update feature location to the segmentation component to perform a segmentation analysis;

receiving an update segment image, an update segment mask and an update segment cutout from the segmentation component;

storing the update segment image, the update segment mask and the update segment cutout in the datastore;

matching the golden image and the update image to verify that the collectible and update object are the same physical object, wherein the matching comprises:

submitting the golden image, golden mask, the update image, and the update segment mask to the matching component;

receiving an update match image and an update confidence factor from the matching component;

comparing the update confidence factor with an update confidence threshold; and if the update confidence factor exceeds the update confidence threshold, designating the update segment mask as the golden mask and the update image as a golden image;

storing the updater ID information, the update geolocation, the golden image, and the update match image on the blockchain.

14. The non-transitory computer-readable medium of claim 13, wherein the matching further comprises comparing the candidate geolocation with a candidate geolocation threshold, and proceeding to assess the confidence factor if the candidate geolocation threshold is exceeded.

15. The non-transitory computer-readable medium of claim 13, wherein the performing the processing of the origin image further comprises receiving an origination date, the performing of the processing of the candidate image further comprises receiving a candidate date, and the performing of the matching further comprises comparing the origination date and the candidate date with a temporal threshold, and proceeding to assess the confidence factor if the temporal threshold is exceeded.

16. The non-transitory computer-readable medium of claim 13, wherein the performing the generation of the segment mask further comprises instructing the segmentation component to utilize a plurality of algorithms and to return a segment image(n), a segment mask(n), a segment cutout(n), and a segment confidence factor(n) resulting from each algorithm run for the segment mask and to designate the segment image(n), segment mask(n), and segment cutout(n) with the highest associated segment confidence factor(n) as the segment image, segment mask, and segment cutout; and wherein the performing the generation of the candidate segment mask further comprises instructing the segmentation component to utilize a plurality of algorithms and to return a candidate segment image(n), a candidate segment mask(n), a candidate segment cutout(n), and a candidate segment confidence factor(n) resulting from each algorithm run for the candidate segment mask and to designate the candidate segment image(n), candidate segment mask(n), and candidate segment cutout(n) with the highest associated candidate segment confidence factor(n) as the candidate segment image, candidate segment mask, and candidate segment cutout.

\* \* \* \* \*